(12) United States Patent
Dheer et al.

(10) Patent No.: US 8,086,508 B2
(45) Date of Patent: Dec. 27, 2011

(54) METHOD AND APPARATUS FOR DELEGATING AUTHORITY

(75) Inventors: Sanjeev Dheer, Scarsdale, NY (US);
Venkatachari Dilip, Cupertino, CA (US); Roy Messing, Ridgefield, CT (US); Jeremy Sokolic, New York, NY (US); Manu Sareen, New York, NY (US); Gautam Sinha, Fremont, CA (US)

(73) Assignee: CashEdge, Inc., New York, NY (US)

( * ) Notice: Subject to any disclaimer, the term of this patent is extended or adjusted under 35 U.S.C. 154(b) by 1112 days.

(21) Appl. No.: 10/134,046

(22) Filed: Apr. 26, 2002

(65) Prior Publication Data

US 2002/0174048 A1 Nov. 21, 2002

Related U.S. Application Data

(63) Continuation-in-part of application No. 09/621,946, filed on Jul. 24, 2000, and a continuation-in-part of application No. 10/040,314, filed on Jan. 3, 2002, now Pat. No. 7,013,310.

(51) Int. Cl.
*G06Q 40/00* (2006.01)
(52) U.S. Cl. .......................................... 705/35; 705/1.1
(58) Field of Classification Search .............. 705/35–40, 705/3
See application file for complete search history.

(56) References Cited

U.S. PATENT DOCUMENTS

| | | | |
|---|---|---|---|
| 4,346,442 A | 8/1982 | Musmanno | |
| 4,694,397 A | 9/1987 | Grant et al. | |
| 5,481,720 A | 1/1996 | Loucks et al. | |
| 5,644,727 A | 7/1997 | Atkins | |
| 5,745,706 A | 4/1998 | Wolfberg et al. | |
| 5,787,427 A | 7/1998 | Benantar et al. | |
| 5,805,719 A | 9/1998 | Pare et al. | |
| 5,826,243 A | 10/1998 | Musmanno et al. | |
| 5,855,020 A | 12/1998 | Kirsch | |
| 5,884,285 A | 3/1999 | Atkins | |
| 5,893,078 A | 4/1999 | Paulson | |
| 5,895,838 A | 4/1999 | Harjunmaa et al. | |
| 5,940,809 A | 8/1999 | Musmanno et al. | |
| 6,012,048 A | 1/2000 | Gustin et al. | |
| 6,018,722 A | 1/2000 | Ray et al. | |
| 6,038,603 A | 3/2000 | Joseph | |
| 6,058,375 A * | 5/2000 | Park | 705/30 |

(Continued)

FOREIGN PATENT DOCUMENTS

GB 2392262 2/2004

(Continued)

OTHER PUBLICATIONS

Dartmouth Research & Consulting Glossaries, 2000 (pp. 1-9).

(Continued)

*Primary Examiner* — Thomas M Hammond, III
(74) *Attorney, Agent, or Firm* — Courtney IP Law; Barbara B. Courtney

(57) ABSTRACT

A delegated authority system allows an account holder to delegate authority to one or more individuals, such as financial advisors through a third party service. An individual receives authority to access financial accounts and/or access aggregated financial data. The individual may then retrieve account information from the individual accounts or from the aggregated financial data. In on exemplary system, the account information is accessed via the Internet or another data communication network.

29 Claims, 19 Drawing Sheets

U.S. PATENT DOCUMENTS

| | | |
|---|---|---|
| 6,058,378 A | 5/2000 | Clark et al. |
| 6,108,641 A | 8/2000 | Kenna et al. |
| 6,108,788 A | 8/2000 | Moses et al. |
| 6,199,077 B1 | 3/2001 | Inala et al. |
| 6,226,623 B1 | 5/2001 | Schein et al. |
| 6,240,399 B1 | 5/2001 | Frank et al. |
| 6,317,783 B1 | 11/2001 | Freishtat et al. |
| 6,321,334 B1 | 11/2001 | Jerger et al. |
| 6,324,523 B1 | 11/2001 | Killeen, Jr. et al. |
| 6,349,290 B1 * | 2/2002 | Horowitz et al. ............... 705/35 |
| 6,374,231 B1 | 4/2002 | Bent et al. |
| 6,381,592 B1 | 4/2002 | Reuning |
| 6,405,245 B1 | 6/2002 | Burson et al. |
| 6,412,073 B1 | 6/2002 | Rangan |
| 6,473,800 B1 | 10/2002 | Jerger et al. |
| 6,510,451 B2 | 1/2003 | Wu et al. |
| 6,513,019 B2 | 1/2003 | Lewis |
| 6,567,850 B1 | 5/2003 | Rajan et al. |
| 6,594,766 B2 | 7/2003 | Rangan et al. |
| 6,598,028 B1 | 7/2003 | Sullivan et al. |
| 6,606,606 B2 | 8/2003 | Starr |
| 6,609,128 B1 | 8/2003 | Underwood |
| 6,633,910 B1 | 10/2003 | Rajan |
| 6,697,860 B1 | 2/2004 | Kung |
| 6,721,716 B1 | 4/2004 | Gross |
| 6,792,082 B1 | 9/2004 | Levine |
| 6,799,167 B1 | 9/2004 | Gullen et al. |
| 6,802,042 B2 | 10/2004 | Rangan et al. |
| 6,829,711 B1 * | 12/2004 | Kwok et al. ................... 713/183 |
| 7,013,310 B2 | 3/2006 | Messing et al. |
| 7,031,939 B1 | 4/2006 | Gallagher |
| 7,430,537 B2 | 9/2008 | Templeton et al. |
| 2002/0010679 A1 * | 1/2002 | Felsher ........................ 705/51 |
| 2002/0010768 A1 | 1/2002 | Marks et al. |
| 2002/0019753 A1 * | 2/2002 | Boden ............................. 705/3 |
| 2002/0083440 A1 * | 6/2002 | Dupuis et al. ................... 725/32 |
| 2006/0015450 A1 | 1/2006 | Guck et al. |

FOREIGN PATENT DOCUMENTS

| | | |
|---|---|---|
| JP | 10149404 A | 6/1998 |
| WO | WO 97-19406 | 5/1997 |
| WO | WO 01-88674 A2 | 11/2001 |

OTHER PUBLICATIONS

Bruce Schneier, Applied Cryptography, Second Edition, Protocols, Algorithms, and Source Code in C, pp. 30-32.

* cited by examiner

| Financial Institution Name | ABA and Routing Info | Internet URL | Account Offerings | Acct Type | Account Interest Rate | Minimum Account Balance |
|---|---|---|---|---|---|---|
| Bank of America | xxxxxxxxx xxxxxxxxx | www.bofa.com | Savings | Asset | 2.00 | Min. 200.00 |
| | | | Non-Intereset Checking | Asset | 0.00 | Min. 100.00 |
| | | | Interest Checking | Asset | 1.50 | Min. 1000.00 |
| | | | CD - 3 Months | Asset | 5.00 | Min. 500.00 |
| | | | Home Equity | Debt | 12.50 | N/A |
| | | | Credit Card | Debt | 18.00 | N/A |
| | | | Overdraft Protection | Debt | 16.00 | N/A |
| Charles Schwab | xxxxxxxxx xxxxxxxxx | www.schwab.com | Money Market | Asset | 4.75 | Min. 2000.00 |
| | | | ABC Mutual Fund | Asset | N/A | Min. 1000.00 |
| . . . | . . . | . . . | . . . | . . . | . . . | . . . |

| Customer Name | Financial Institution | Account Number, Username, P/W | Active Accounts | Account Balance | User Preferences |
|---|---|---|---|---|---|
| John Smith | Bank of America | xxxxxxxxx xxxxxxx xxxxxx | Savings | 2208.63 | Make all recommendations; Maintain minimum balance of $1500 in Interest Checking; Do not transfer more than $4000 per week; Pay down Overdraft Protection first; Do not withdraw funds from Rainbow Credit Union Savings account. |
| | Bank of America | xxxxxxxxx xxxxxxx xxxxxx | Intereset Checking | 4126.87 | |
| | Bank of America | xxxxxxxxx xxxxxxx xxxxxx | Home Equity | 12,240.32 | |
| | Bank of America | xxxxxxxxx xxxxxxx xxxxxx | Credit Card | 3,566,45 | |
| | Bank of America | xxxxxxxxx xxxxxxx xxxxxx | Overdraft Protection | 821.54 | |
| | Charles Schwab | xxxxxxxxx xxxxxxx xxxxxx | Money Market | 3628.94 | |
| | Rainbow Credit Union | xxxxxxxxx xxxxxxx xxxxxx | Savings | 562.34 | |
| Jane Doe | Bank One | xxxxxxxxx xxxxxxx xxxxxx | Savings | 261.79 | Do not recommend opening new accounts. |
| | Bank One | xxxxxxxxx xxxxxxx xxxxxx | Non-Interest Checking | 8245.21 | |
| . . . | . . . | . . . | . . . | . . . | . . . |

METHOD AND APPARATUS FOR DELEGATING AUTHORITY

RELATED APPLICATIONS

This application is a continuation-in-part of co-pending application Ser. No. 09/621,946, filed Jul. 24, 2000, entitled "Method and Apparatus for Analyzing Financial Data", and incorporated herein by reference.

This application is a continuation-in-part of application Ser. No. 10/040,314, filed Jan. 3, 2002 now U.S. Pat. No. 7,013,310, entitled "Method and Apparatus for Retrieving and Processing Data", and incorporated herein by reference.

TECHNICAL FIELD

The present invention relates to the handling of data and, more particularly, to the delegation of authority to access data to one or more individuals, such as a financial advisor.

BACKGROUND

Customers of financial institutions (both individual customers and businesses) typically maintain multiple financial accounts at one or more financial institutions. Financial institutions include, for example, banks, savings and loans, credit unions, mortgage companies, lending companies, and stock brokers. These financial accounts include asset accounts (such as savings accounts, checking accounts, certificates of deposit (CDs), mutual funds, bonds, and equities) and debt accounts (such as credit card accounts, mortgage accounts, home equity loans, overdraft protection, and other types of loans).

In many situations, a user's asset accounts may not be earning the best available interest rate or the user's debt accounts my not be at the most competitive interest rate. It would be to the user's benefit to adjust the funds between different accounts to maximize the interest earned in the asset accounts and/or minimize the interest paid in the debt accounts. For example, a user may have a checking account that pays no interest, but has a high balance. A portion of the funds in the checking account could be transferred to a savings account or other asset account that pays interest on the funds in the account. Similarly, a user with a high credit card balance could save money if a portion of the credit card balance was transferred to a home equity line of credit at a lower interest rate.

Additionally, certain consumers may wish to provide access to one or more individuals, such as financial advisors, who are able to retrieve financial data related to the customer's accounts. Using existing techniques, the customer provides printed account statements to a financial advisor for analysis. However, this information is typically out-of-date by the time it reaches the financial advisor. Existing systems do not provide a timely system for providing financial information to a financial advisor. Further, existing systems do not provide a mechanism for delegating financial authority associated with multiple financial accounts to another individual, such as a financial advisor.

The systems and methods described herein allow a customer to delegate authority to one or more individuals, such as a financial advisor, spouse, accountant, assistant, lawyer, etc. In specific embodiments, the delegation of authority (such as financial authority) is performed via a third party through an Internet web site or other mechanism.

SUMMARY

The systems and methods described herein allow a user to delegate authority to one or more individuals to access the accounts associated with the account holder and/or to access data aggregated from multiple accounts. The individual receiving the authority may access data aggregated from the user's multiple accounts or data aggregated from multiple accounts associated with multiple users. The systems and methods described herein allow the individual to access current account information and make decisions based on the current account information.

In one embodiment, an individual is identified to which an account holder is to delegate access to data associated with the account holder. Data is identified that the individual is permitted to access. Additionally, activities are identified that the individual is permitted to perform. The identified individual, the identified data, and the identified activities are stored in a central location.

In another embodiment, an individual to which an account holder is to delegate financial authority is identified. A first account to which the individual is delegated financial authority is identified. The first account belongs to the account holder and is associated with a first financial institution. A second account to which the individual is delegated financial authority is identified. The second account belongs to the account holder and is associated with a second financial institution. The individual is permitted to access the first account and the second account.

In a described embodiment, the individual receives permission to transfer funds into or out of the first financial account.

In another embodiment, the individual generates reports based on account information retrieved from the first account and the second account.

BRIEF DESCRIPTION OF THE DRAWINGS

FIG. 12 is a table illustrating various information associated with different financial institutions.

FIG. 13 is a table illustrating various customer information related to financial accounts and user preferences.

DETAILED DESCRIPTION

Figure 1:
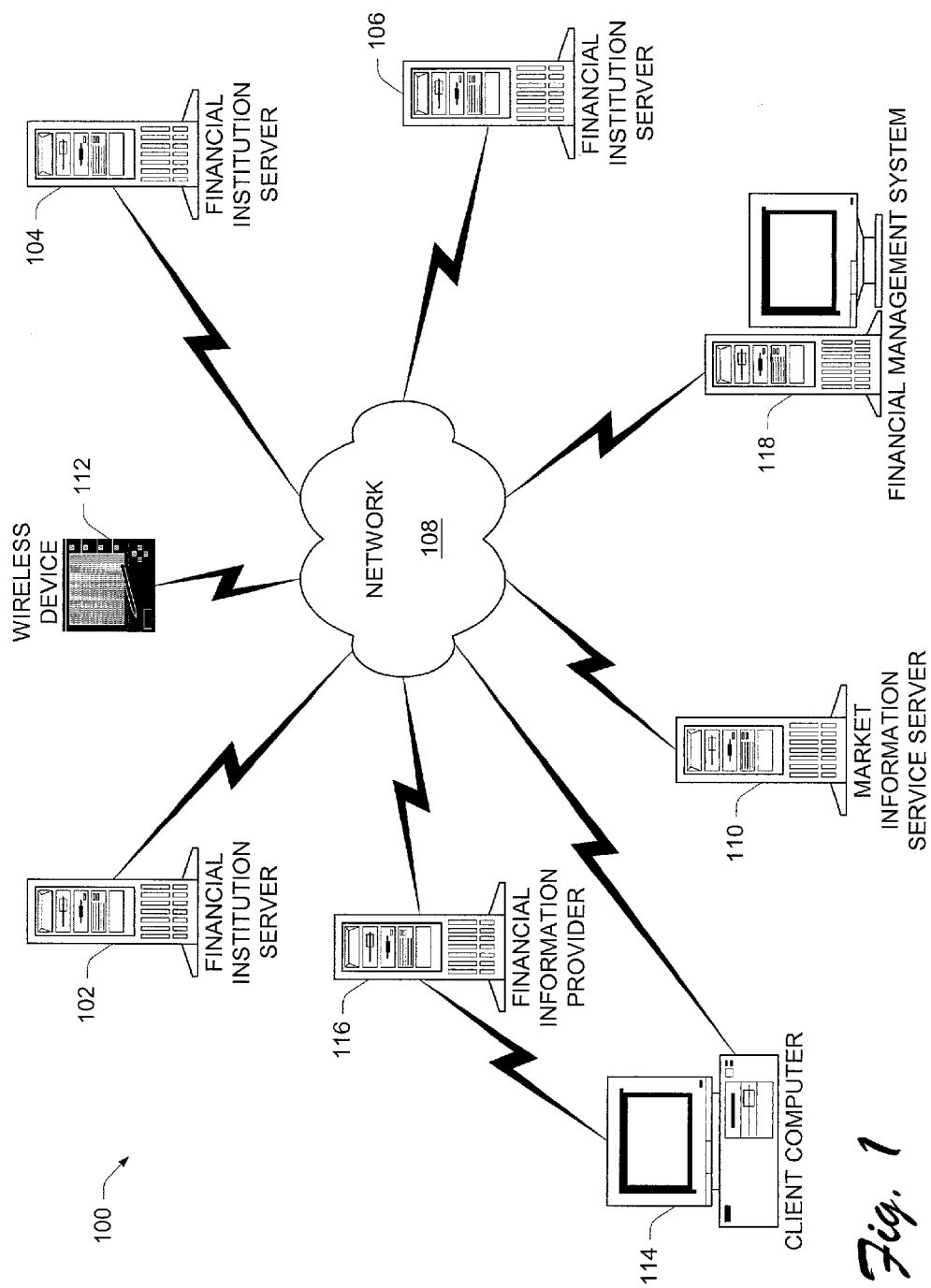
FIG. 1 illustrates an exemplary network environment in which various servers, computing devices, and financial management systems exchange data across a network, such as the Internet.

The systems and methods described herein allow a user (also referred to as an account holder) to delegate authority, such as financial authority, to an individual to access the account holder's accounts, such as financial accounts. Additionally, an account holder may delegate financial authority to access a listing or database containing aggregated account data. Aggregated account data is data collected from the account holder's various accounts and stored or listed in a common location. The individual may collect information related to all of the account holder's accounts, analyze the account information, and make recommendations based on the analysis. Various tools may be used by the individual to aggregate data from multiple accounts and from multiple account holders. The tools also allow the individual to create reports or messages based on information collected from multiple accounts.

The specific examples discussed herein are directed toward aggregating financial data and providing authority to access this aggregated financial data as well as access financial accounts directly. However, in alternate embodiments, a user may delegate authority to access any type of account and to delegate authority to access any type of aggregated data. Alternate types of accounts/data include cellular phone usage, automobile usage and service records, etc.

Additional systems and methods described herein automatically analyze multiple financial accounts to determine whether the account balances are optimized based on the best available interest rates, the interest rates associated with the multiple financial accounts, and the balances of the multiple financial accounts. After analyzing the accounts, recommendations are provided, if necessary, for adjusting account funds to allow the account holder to earn greater interest in asset accounts and/or pay less interest in debt accounts. Additionally, recommendations may be provided to adjust account funds from one or more asset accounts to one or more debt accounts, or vice versa, if such an adjustment is favorable to the account holder. The systems and methods described herein may operate in a proactive manner, such that the various recommendations are generated without any action or request by the user. The financial management system described herein may regularly analyze a user's accounts and make recommendations, if appropriate, on its own initiative, without any prompting from the user.

As used herein, the terms "account holder", "customer", "user", and "client" are interchangeable. "Account holder" refers to any person having access to an account. A particular account may have multiple account holders (e.g., a joint checking account having husband and wife as account holders or a corporate account identifying several corporate employees as account holders). Various financial account and financial institution examples are provided herein for purposes of explanation. However, it will be appreciated that the system and procedures described herein can be used with any type of asset account and any type of debt account. Example asset accounts include savings accounts, money market accounts, checking accounts (both interest-bearing and non-interest-bearing), certificates of deposit (CDs), mutual funds, bonds, and equities. Example debt accounts include credit card accounts, mortgage accounts, home equity loans, overdraft protection, margin accounts, personal loans, and other types of loans. Exemplary financial institutions include banks, savings and loans, credit unions, mortgage companies, mutual fund companies, lending companies, and stock brokers.

Various attributes associated with an asset account and/or a debt account are discussed herein. These attributes are used to analyze various accounts and make recommendations that would benefit the account holder. Example attributes include interest rate, loan repayment terms, minimum balance, type of collateral, etc. Although particular examples are discussed herein with reference to interest rates, it will be appreciated that the methods and systems described herein are applicable to any type of attribute.

FIG. 1 illustrates an exemplary network environment 100 in which various servers, computing devices, and financial management systems exchange data across a data communication network. The network environment of FIG. 1 includes multiple financial institution servers 102, 104, and 106 coupled to a data communication network 108, such as the Internet. A market information service server 110 and a financial management system 118 are also coupled to network 108. Additionally, a wireless device 112 and a client computer 114 are coupled to network 108. Wireless device 112 may be a personal digital assistant (PDA), a handheld or portable computer, a cellular phone, a pager, or any other device capable of communicating with other devices via a wireless connection. A financial information provider 116 is coupled between network 108 and client computer 114.

Network 108 may be any type of data communication network using any communication protocol. Further, network 108 may include one or more sub-networks (not shown) which are interconnected with one another.

The communication links shown between the network 108 and the various devices (102-106 and 110-118) shown in FIG. 1 can use any type of communication medium and any communication protocol. For example, one or more of the communication links shown in FIG. 1 may be a wireless link (e.g., a radio frequency (RF) link or a microwave link) or a wired link accessed via a public telephone system or another communication network. Wireless device 112 typically accesses network 108 via a wireless connection to another communication network that is coupled to network 108. Certain devices, such as servers, may be coupled to a local area network (LAN), which is coupled to network 108. Client computer 114 may access network 108 in different ways. First, client computer 114 may directly access network 108, for example, by using a modem to access a public telephone network (e.g., a public switched telephone network (PSTN)) that is coupled to network 108. Alternately, client computer 114 may access financial information provider 116, which establishes a connection to network 108. Financial information provider 116 may act as a "buffer" between network 108 and client computer 114, or may allow commands and data to simply pass-through between the network 108 and the client computer 114.

Each of the financial institution servers 102, 104, and 106 are typically associated with a particular financial institution and store data for that financial institution, such as customer account data. The market information service server 110 may represent one or more services that collect and report information regarding current financial market conditions. For example, a particular market information service may collect information from many financial institutions to generate a report identifying the average interest rates for savings, checking, or other accounts. The report may also identify the highest rates for each type of account and the financial institution offering those rates. Multiple market information service servers 110 may be coupled to network 108, each server providing a different type of market data.

Financial management system 118 performs various account analysis functions to determine whether a user's financial accounts (e.g., both asset accounts and debt accounts) are optimized. These analysis functions are discussed in greater detail below. Wireless device 112 and client computer 114 allow a user to access information via the network 108. For example, the user can access account information from one of the financial institution servers 102, 104, or 106, access current interest rate data from market information service server 110, or send a request for an analysis of the user's financial accounts to financial management system 118. Financial information provider 116 acts as an intermediary between client computer 114 and other devices coupled to network 108. For example, client computer 114 generates a request for data or account analysis and communicates the request to the financial information provider 116. The financial information provider 116 then retrieves the requested data or initiates the requested account analysis on behalf of the user of client computer 114.

Figure 2:
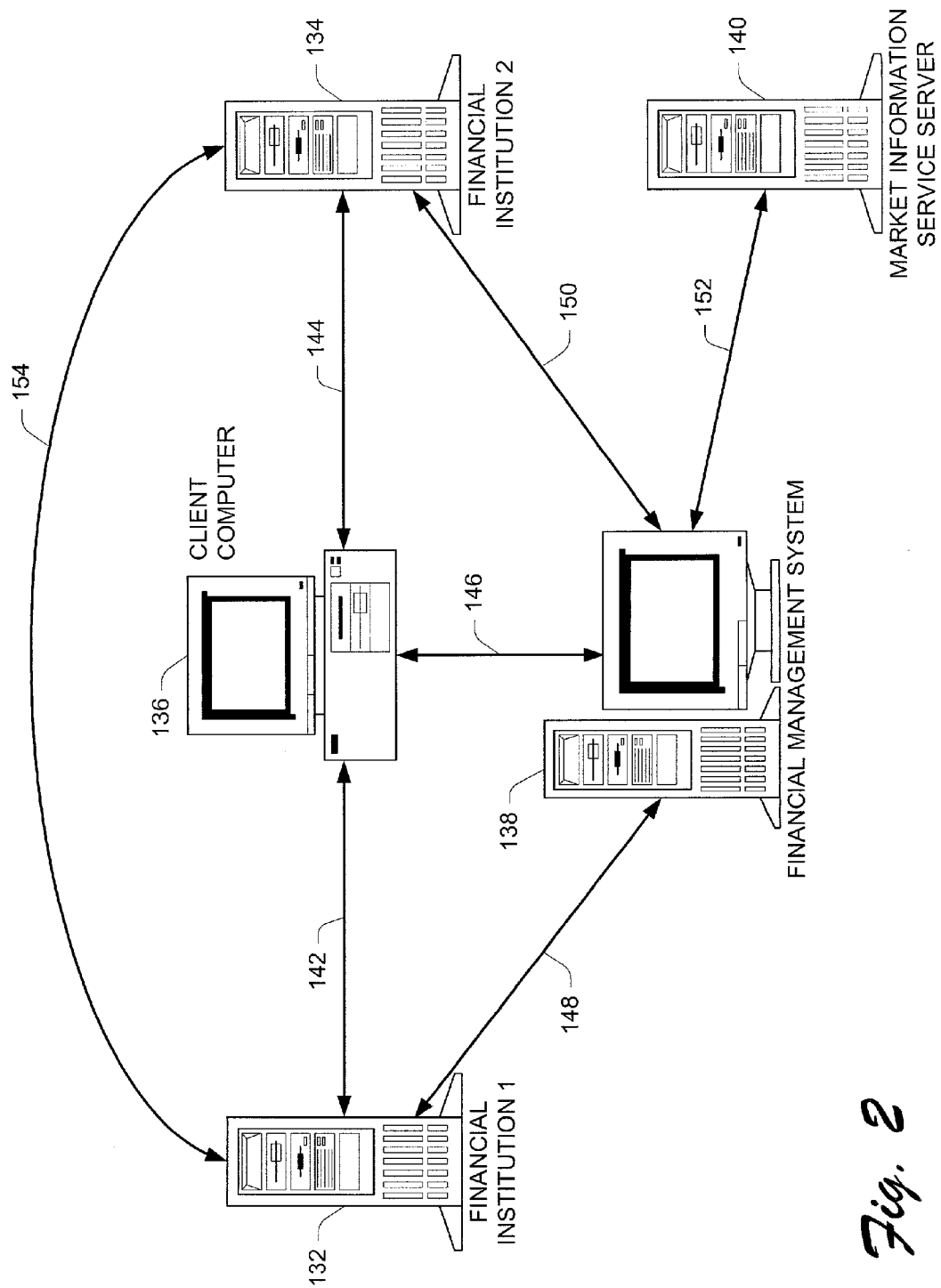
FIG. 2 illustrates an example of the interaction between a particular pair of financial institution servers, a market information service, a client computer, and a financial management system.

FIG. 2 illustrates an example of the interaction between a particular pair of financial institution servers 132 and 134, a market information service server 140, a client computer 136, and a financial management system 138. Client computer 136 is capable of accessing financial institution server 132 via a communication link 142 and accessing financial institution server 134 via a communication link 144. For example, the user of client computer 136 may retrieve account information or interest rate information from one or both of the financial institution servers 132, 134. Client computer 136 is also capable of interacting with financial management system 138 via a communication link 146. The user of client computer 136 may access financial management system 138, for example, to have the system analyze the user's financial accounts.

Financial management system 138 is coupled to the two financial institution servers 132 and 134 via two communication links 148 and 150, respectively. Communication links 148 and 150 allow the financial management system 138 to retrieve information from the financial institution servers 132, 134, and execute transactions on the financial institution servers on behalf of the user of client computer 136. Financial management system 138 is also coupled to market information service server 140 through a communication link 152, which allows the financial management system to retrieve various information regarding market interest rates and other market data. Financial institution servers 132 and 134 are capable of communicating with one another via a communication link 154, which allows the servers to exchange data and other information with one another.

Communication links 142-154 may be dial-up connections and/or connections via one or more networks of the type discussed above with respect to FIG. 1.

Figure 3:
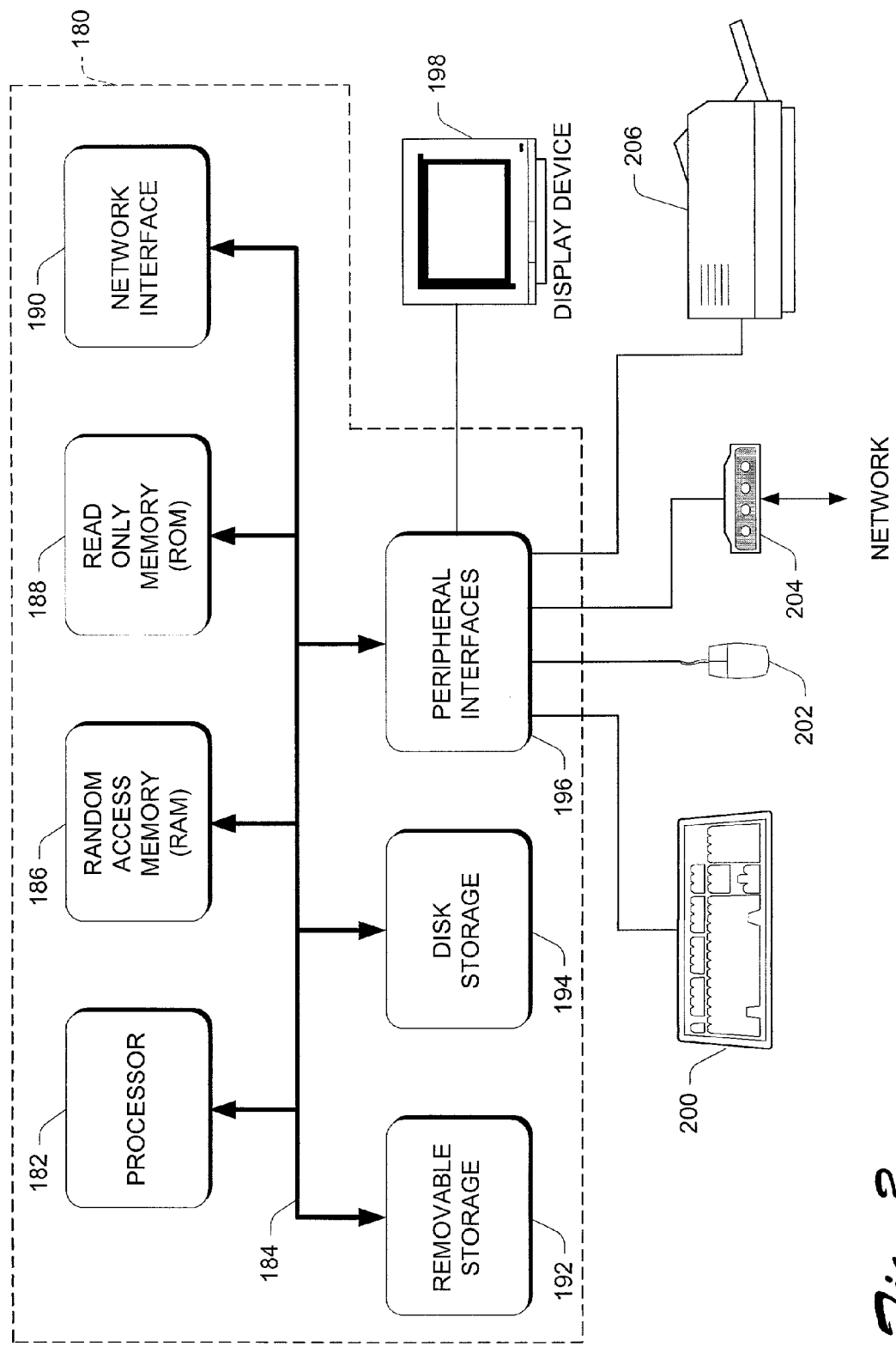
FIG. 3 is a block diagram showing pertinent components of a computer in accordance with the invention.

FIG. 3 is a block diagram showing pertinent components of a computer 180 in accordance with the invention. A computer such as that shown in FIG. 3 can be used, for example, to perform various financial analysis operations such as accessing and analyzing a user's financial account information to make account recommendations. Computer 180 can also be used to access a web site or other computing facility to access the various financial analysis functions. The computer shown in FIG. 3 can function as a server, a client computer, or a financial management system, of the types discussed herein.

Computer 180 includes at least one processor 182 coupled to a bus 184 that couples together various system components. Bus 184 represents one or more of any of several types of bus structures, such as a memory bus or memory controller, a peripheral bus, and a processor or local bus using any of a variety of bus architectures. A random access memory (RAM) 186 and a read only memory (ROM) 188 are coupled to bus 184. Additionally, a network interface 190 and a removable storage device 192, such as a floppy disk or a CD-ROM, are coupled to bus 184. Network interface 190 provides an interface to a data communication network such as a local area network (LAN) or a wide area network (WAN) for exchanging data with other computers and devices. A disk storage 194, such as a hard disk, is coupled to bus 184 and provides for the non-volatile storage of data (e.g., computer-readable instructions, data structures, program modules and other data used by computer 180). Although computer 180 illustrates a removable storage 192 and a disk storage 194, it will be appreciated that other types of computer-readable media which can store data that is accessible by a computer, such as magnetic cassettes, flash memory cards, digital video disks, and the like, may also be used in the exemplary computer.

Various peripheral interfaces 196 are coupled to bus 184 and provide an interface between the computer 180 and the individual peripheral devices. Exemplary peripheral devices include a display device 198, a keyboard 200, a mouse 202, a modem 204, and a printer 206. Modem 204 can be used to access other computer systems and devices directly or by connecting to a data communication network such as the Internet.

A variety of program modules can be stored on the disk storage 194, removable storage 192, RAM 186, or ROM 188, including an operating system, one or more application programs, and other program modules and program data. A user can enter commands and other information into computer 180 using the keyboard 200, mouse 202, or other input devices (not shown). Other input devices may include a microphone, joystick, game pad, scanner, satellite dish, or the like.

Computer 180 may operate in a network environment using logical connections to other remote computers. The remote computers may be personal computers, servers, routers, or peer devices. In a networked environment, some or all of the program modules executed by computer 180 may be retrieved from another computing device coupled to the network.

Typically, the computer 180 is programmed using instructions stored at different times in the various computer-readable media of the computer. Programs and operating systems are often distributed, for example, on floppy disks or CD-ROMs. The programs are installed from the distribution media into a storage device within the computer 180. When a program is executed, the program is at least partially loaded into the computer's primary electronic memory. As described herein, the invention includes these and other types of computer-readable media when the media contains instructions or programs for implementing the steps described below in conjunction with a processor. The invention also includes the computer itself when programmed according to the procedures and techniques described herein.

For purposes of illustration, programs and other executable program components are illustrated herein as discrete blocks, although it is understood that such programs and components reside at various times in different storage components of the computer, and are executed by the computer's processor. Alternatively, the systems and procedures described herein can be implemented in hardware or a combination of hardware, software, and/or firmware. For example, one or more application specific integrated circuits (ASICs) can be programmed to carry out the systems and procedures described herein.

Figure 4:
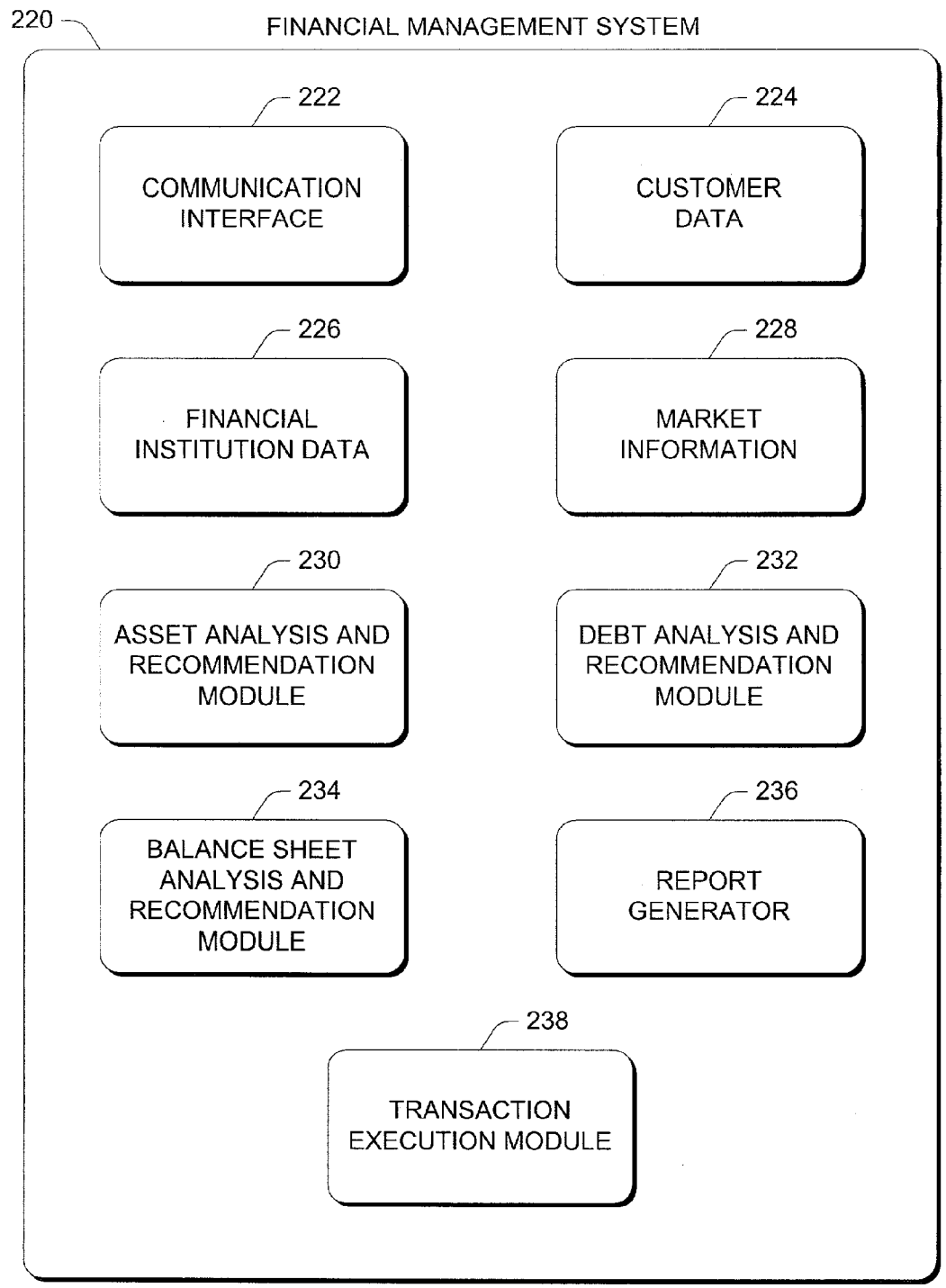
FIG. 4 is a block diagram showing exemplary components and modules of a financial management system.

FIG. 4 is a block diagram showing exemplary components and modules of a financial management system 220. A communication interface 222 allows the financial management system 220 to communicate with other computing systems, such as servers, client computers, and portable computing devices. In one embodiment, communication interface 222 is a network interface to a LAN, which is coupled to another data communication network, such as the Internet.

The financial management system 220 stores customer data 224, such as customer account information, online banking login name and password, and user preferences. Financial management system 220 also stores financial institution data 226 and market information 228. Financial institution data 226 includes, for example, transaction routing data, account offerings, account interest rates, and minimum account balances. Market information 228 includes data such as average interest rates for different types of accounts (both asset accounts and debt accounts), the best available interest rates for each type of account, and the financial institutions offering the best available interest rates.

An asset analysis and recommendation module 230 analyzes various asset accounts to determine whether the accounts are earning the best available interest rates (or close to the best interest rates) and whether the fund allocation among the asset accounts is optimal or close to optimal. If fund adjustments would benefit the account holder, then module 230 makes the appropriate recommendations to the account holder. The asset accounts analyzed may be associated with two or more different financial institutions. A debt analysis and recommendation module 232 analyzes various debt accounts to determine whether the accounts are paying the most competitive (i.e., the lowest) interest rates or close to the best interest rates. Module 232 also determines whether the allocation of funds among the debt accounts is optimal or close to optimal, and makes recommendations, if necessary, to adjust funds in a manner that reduces the overall interest payments. The debt accounts analyzed may be associated with two or more different financial institutions.

A balance sheet analysis and recommendation module 234 analyzes both asset accounts and debt accounts to determine whether the allocation of funds among all of the accounts is optimal or close to optimal. If fund adjustments would benefit the account holder, then the balance sheet analysis and recommendation module 234 makes the appropriate recommendations to the account holder.

A report generator 236 generates various types of reports, such as account activity history, current recommendations to adjust funds among accounts, or a report comparing the current market interest rates to the interest rates of a user's current accounts. A transaction execution module 238 executes financial transactions at the direction of account holders. For example, an account holder may request that the financial management system 220 execute the recommendations generated by one or more of the three analysis and recommendation modules 230, 232, and 234. In this example, transaction execution module 238 identifies the recommendations and executes the financial transactions necessary to implement the recommendations.

Figure 5:
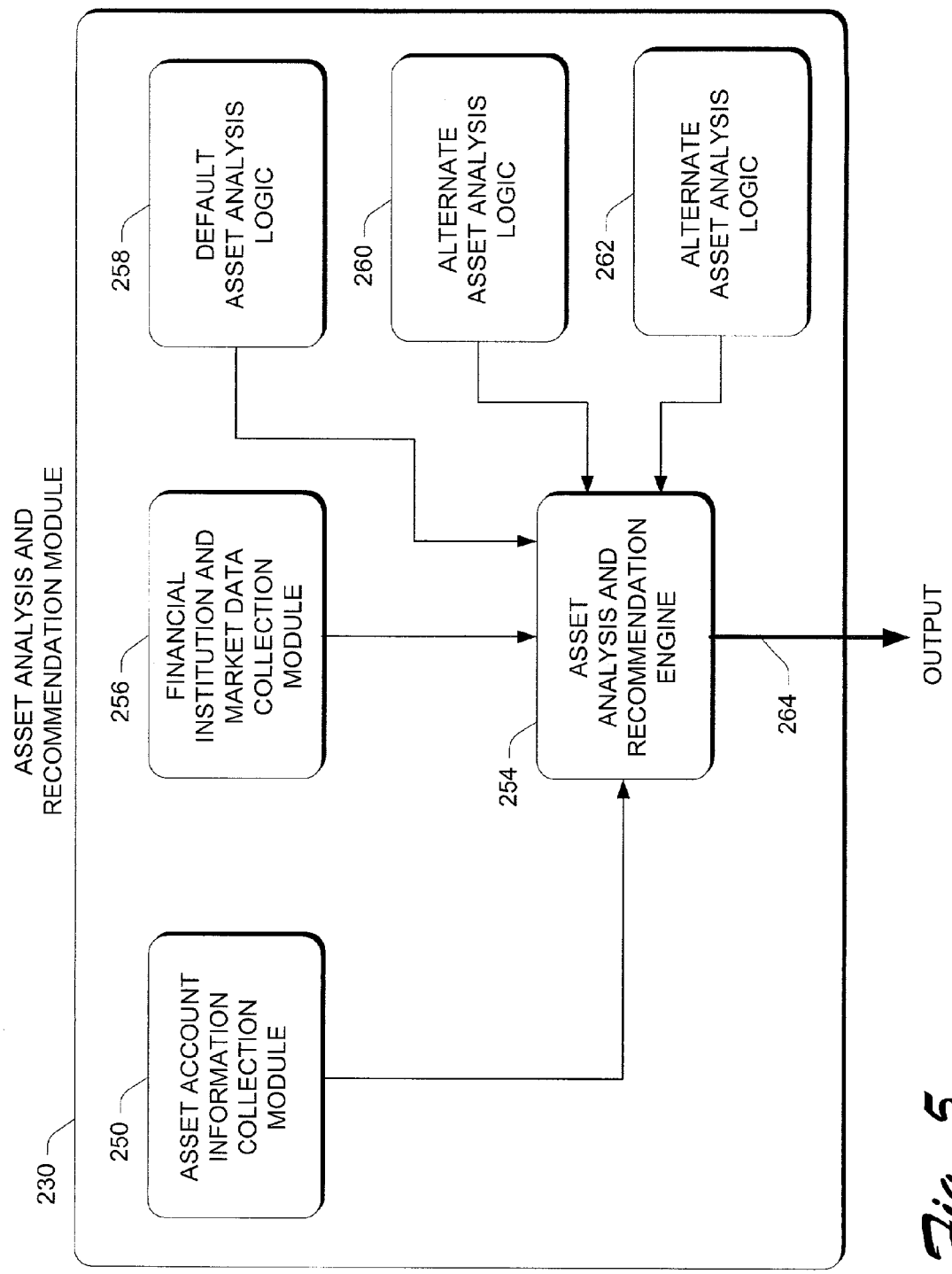
FIG. 5 is a block diagram showing exemplary components and modules of an asset analysis and recommendation module.

FIG. 5 is a block diagram showing exemplary components and modules of asset analysis and recommendation module 230. An asset account information collection module 250 collects information about a user's asset accounts. When a user accesses the financial management system and requests an analysis of the user's asset accounts, the system prompts the user to enter account information for all of the user's asset accounts. The information provided for each account may include the name of the financial institution, the account number, and the login name and password for online access to the account. This information is typically stored by the financial management system to avoid asking the user to re-enter the same information in the future. Based on the information provided by the user, the asset account information collection module 250 is able to access the user's accounts and determine the balance of each account as well as other information such as the interest rate and minimum balance for the account.

After collecting the user's asset account information, the collection module 250 organizes the account information into a common format and communicates the information to an asset analysis and recommendation engine 254 for processing.

A financial institution and market data collection module 256 collects information about particular financial institutions (e.g., transaction routing information and account offerings) and information about current market interest rates. The information about financial institutions may be retrieved from the financial institutions themselves or from one or more market information services that provide information about various financial institutions. The information relating to current market interest rates is collected from one or more market information services. After collecting the financial institution information and the market data, the collection module 256 communicates the collected information and data to the asset analysis and recommendation engine 254.

A default asset analysis logic 258 defines a default set of logic rules used to analyze a user's asset accounts. These default logic rules are used if the user does not create their own set of logic rules and does not select from one of several sets of alternate asset analysis logic rules 260 and 262. The alternate logic rules 260 and 262 may provide different approaches to asset account analysis (e.g., a conservative approach, a moderate approach, or an aggressive approach). In particular embodiments, at least one of the alternate logic rules 260, 262 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user regularly makes a $1000 payment from a particular checking account on the 15th of each month, a rule may be created by the financial management system to ensure that the checking account has at least a $1000 balance on the 14th of each month. If the checking account does not have a sufficient balance, then the financial management system may recommend a fund transfer to raise the balance of the checking account to cover the anticipated $1000 payment on the 15th. This type of user-specific logic rule may be stored with the other user data in the financial management system.

Asset analysis and recommendation engine 254 analyzes the user's asset account information by applying the various asset analysis logic rules to the asset account information.

The asset analysis and recommendation engine 254 also considers market data collected by collection module 256 when analyzing the user's asset accounts. After analyzing the user's asset accounts, the asset analysis and recommendation engine 254 generates one or more recommendations to adjust the fund allocation among the asset accounts. The recommendation may also include opening a new asset account (e.g., an account that pays a higher interest rate) and/or closing an existing asset account (e.g., an account that pays a low interest rate). The recommendations and analysis results are output on communication link 264 for use by other modules or components in the financial management system.

Figure 6:
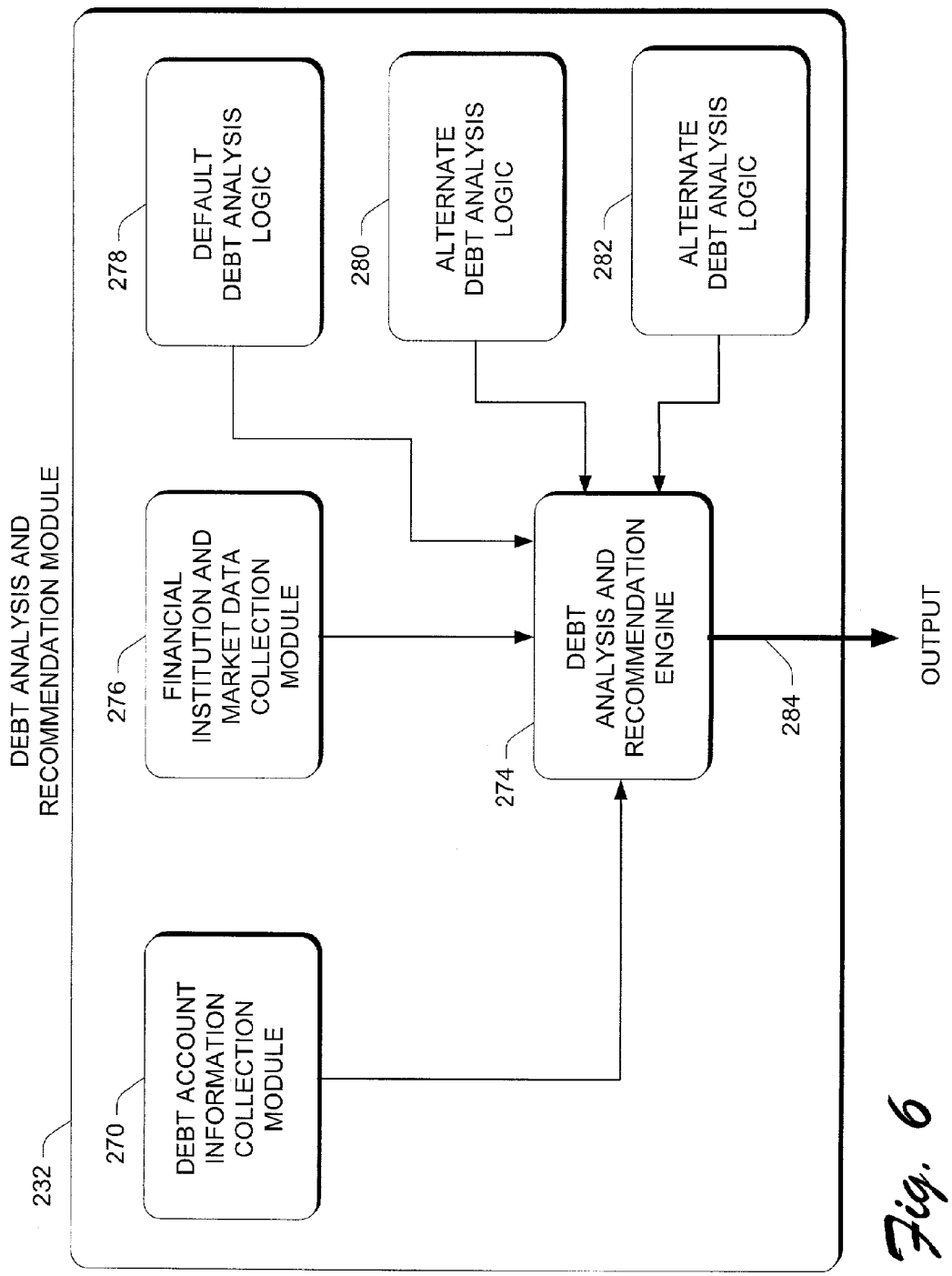
FIG. 6 is a block diagram showing exemplary components and modules of a debt analysis and recommendation module.

FIG. 6 is a block diagram showing exemplary components and modules of debt analysis and recommendation module 232. A debt account information collection module 270 collects information about a user's debt accounts. When a user accesses the financial management system and requests an analysis of the user's debt accounts, the system prompts the user to enter account information for each of the user's debt accounts. The information provided for each account may include the name of the financial institution, the account number, and information necessary to access the account online. This information is typically stored by the financial management system to avoid asking the user to re-enter the same information in the future. Based on the information provided by the user, the debt account collection module 270 accesses the user's debt accounts and determines the balance of each account as well as other information, such as the interest charged and the maximum balance for the account.

After collecting the user's debt account information, the collection module 270 organizes the account information into a common format and communicates the account information to a debt analysis and recommendation engine 274 for processing.

A financial institution and market data collection 276 collects information regarding particular financial institutions and information about current market interest rates. The information relating to financial institutions may be retrieved from the financial institutions themselves or from one or more market information services that provide information about various financial institutions. The information relating to current market interest rates is collected from one or more market information services. After collecting the financial institution information and the market data, the collection module 276 communicates the collected information and data to the debt analysis and recommendation engine 274.

A default debt analysis logic 278 defines a default set of logic rules used to analyze a user's debt accounts. These default logic rules are used if the user does not create their own set of logic rules and does not select from one of the several sets of alternate debt analysis logic 280 and 282. The alternate logic rules 280 and 282 may provide different approaches to debt account analysis, such as a conservative approach, a moderate approach, or an aggressive approach. In a particular embodiment, at least one of the alternate logic rules 280, 282 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has too many expenses (i.e., the current month's expenses exceed the user's typical monthly income), then the logic rules may suggest a short-term loan to cover the expenses, thereby avoiding a situation in which the user has insufficient funds to pay bills as they become due. Additionally, if the loan will only be required for a short period of time, the rules may suggest opening (or taking advantage of an existing) overdraft protection account.

Different debt logic rules may be applied depending on a user's opinions regarding debt. One user might use the majority of available assets to pay down debts, thereby minimizing the user's level of debt. Another user might want to maintain a larger "cushion" of cash and only pay down debts if the available assets exceed a predetermined amount (e.g., $10,000). Debt rules from, for example, a celebrity or well-known financial analyst might recommend setting aside savings at the beginning of the month to "force" the appropriate monthly savings. The remainder of the assets are then used to pay monthly bills and other expenses. Other financial analysts may use different sets of logic rules to define the analysis and handling of asset accounts and debt accounts.

Debt analysis and recommendation engine 274 analyzes the user's debt account information by applying the various debt analysis logic rules to the debt account information. The debt analysis and recommendation engine 274 also considers market data collected by collection module 276 when analyzing the user's debt accounts. After analyzing the user's debt accounts, the debt analysis and recommendation engine 274 generates one or more recommendations to adjust the fund allocation among the debt accounts. The recommendation may also include opening a new debt account (e.g., an account with a lower interest rate) and/or closing an existing debt account (e.g., an account with a high interest rate). The recommendations and analysis results are output on communication link 284 for use by other modules or components in the financial management system.

Figure 7:
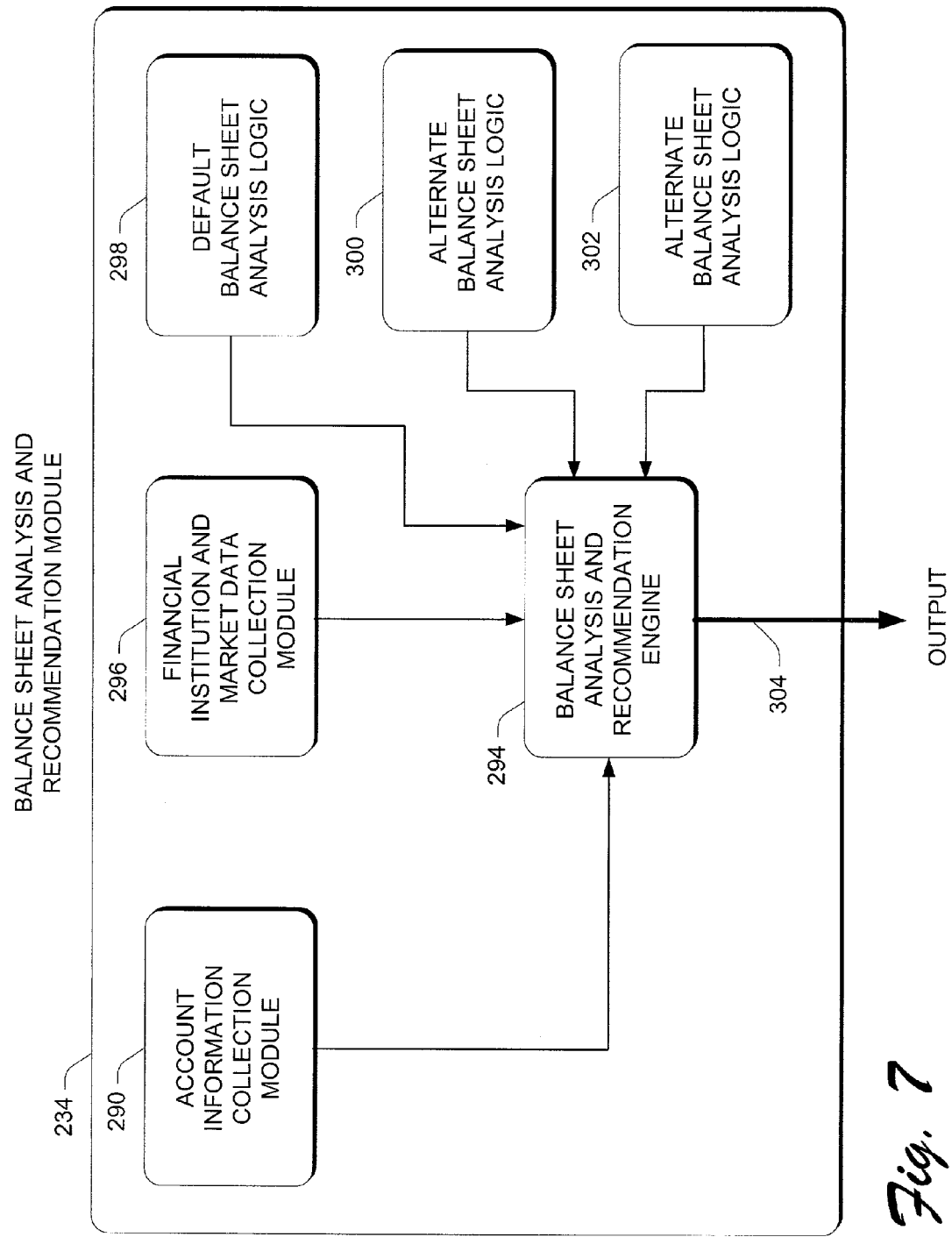
FIG. 7 is a block diagram showing exemplary components and modules of a balance sheet analysis and recommendation module.

FIG. 7 is a block diagram showing exemplary components and modules of balance sheet analysis and recommendation module 234. An account information collection module 290 collects information about a user's asset accounts and debt accounts. When a user accesses the financial management system and requests an analysis of the user's balance sheet, the system prompts the user to enter account information for each of the user's asset accounts and debt accounts. The information provided for each account may include the name of the financial institution, the account number, and information necessary to access the account online. This information is typically stored by the financial management system to avoid asking the user to re-enter the same information in the future. Based on the information provided by the user, the account collection module 290 accesses the user's debt accounts and determines the balance of each account as well as other information, such as the interest charged or earned, and the maximum balance or credit limit associated with the account.

After collecting the user's asset and debt account information, the collection module 290 organizes the account information into a common format and communicates the account information to a balance sheet analysis and recommendation engine 294 for processing.

A financial institution and market data collection 296 collects information regarding particular financial institutions and information about current market interest rates for both asset accounts and debt accounts. The information relating to financial institutions may be retrieved from the financial institutions themselves or from one or more market information services that provide information about various financial institutions. The information relating to current market interest rates is collected from one or more market information services. After collecting the financial institution information and the market data, the collection module 296 communicates the collected information and data to the balance sheet analysis and recommendation engine 294.

A default balance sheet analysis logic 298 defines a default set of logic rules used to analyze a user's balance sheet. These default logic rules are used if the user does not create their own set of logic rules and does not select from one of the several sets of alternate balance sheet analysis logic 300 and 302. The alternate logic rules 300 and 302 may provide different approaches to debt account analysis, such as a conservative approach, a moderate approach, or an aggressive approach. In a particular embodiment, at least one of the alternate logic rules 300, 302 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has funds earning a low interest rate in a savings account and carries a balance on a credit card with a high interest rate, the logic rules may suggest applying some or all of the funds in the savings account to pay off all or a portion of the balance on the credit card.

Different balance sheet logic rules may be applied depending on a user's opinions regarding assets and debts. One user might prefer to use the majority of available assets to pay down debts, thereby minimizing the user's level of debt. Another user might want to maintain a larger "cushion" of cash and only pay down debts if the available assets exceed a predetermined amount (e.g., $5,000).

Balance sheet analysis and recommendation engine 294 analyzes the user's balance sheet information by applying the various balance sheet analysis logic rules to the balance sheet information. The balance sheet analysis and recommendation engine 294 also considers financial institution and market data collected by collection module 296 when analyzing the user's balance sheet. After analyzing the user's balance sheet, the balance sheet analysis and recommendation engine 294 generates one or more recommendations to adjust the fund allocation among the user's asset accounts and debt accounts. The recommendation may also include opening one or more new accounts and/or closing one or more existing accounts. The recommendations and analysis results are output on communication link 304 for use by other modules or components in the financial management system.

Figure 8:
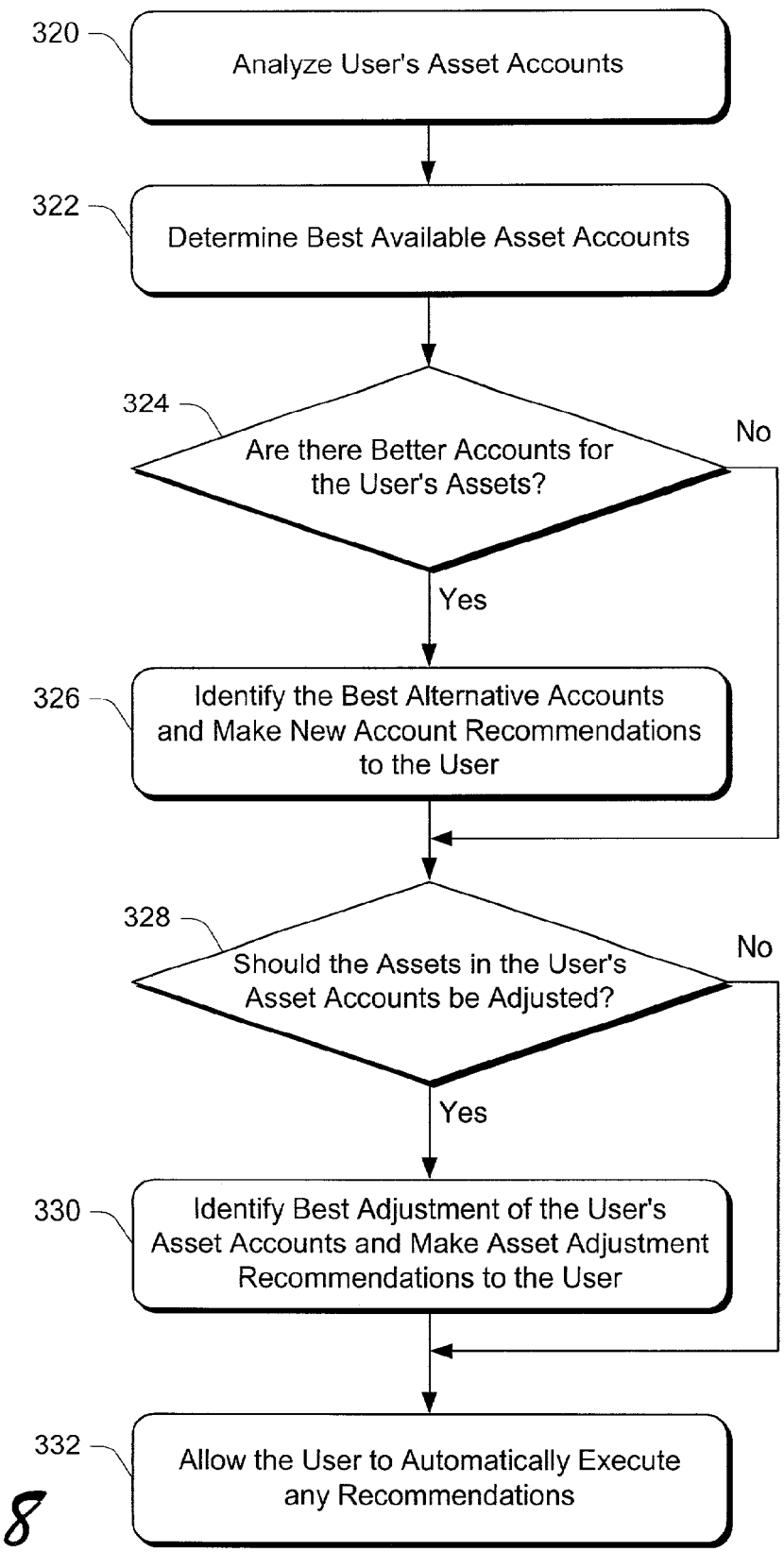
FIG. 8 is a flow diagram illustrating a procedure for identifying financial transactions to optimize a user's asset account balances.

FIG. 8 is a flow diagram illustrating a procedure for identifying financial transactions to optimize a user's asset account balances. The procedure begins by analyzing the user's asset accounts (block 320). The procedure then determines the best available asset accounts (block 322), for example, by using market interest rate information from a market information service. Next, the procedure determines whether there are better accounts for the user's assets (block 324). These "better" accounts may include asset accounts that earn higher interest rates than the user's current asset accounts.

If the procedure identifies better accounts for the user's assets, then the procedure selects the best alternative account (or accounts) and makes a recommendation that the user open the alternative account (block 326). If the procedure does not identify any better accounts for the user's assets, then the procedure continues to block 328, where the procedure determines whether the assets in the user's accounts should be adjusted. If the user's asset accounts should be adjusted, then the procedure identifies the best adjustment of the user's asset accounts and makes asset adjustment recommendations to the user (block 330). Finally, the user is provided the opportunity to automatically execute any of the recommendations, such as opening one or more new asset accounts and/or moving funds between asset accounts (block 332). If the user chooses to have the recommendations executed automatically, the financial management system executes the necessary financial transactions to implement the system's recommendations. The procedure described above with respect to FIG. 8 may be implemented, for example, by asset analysis and recommendation module 230.

Figure 9:
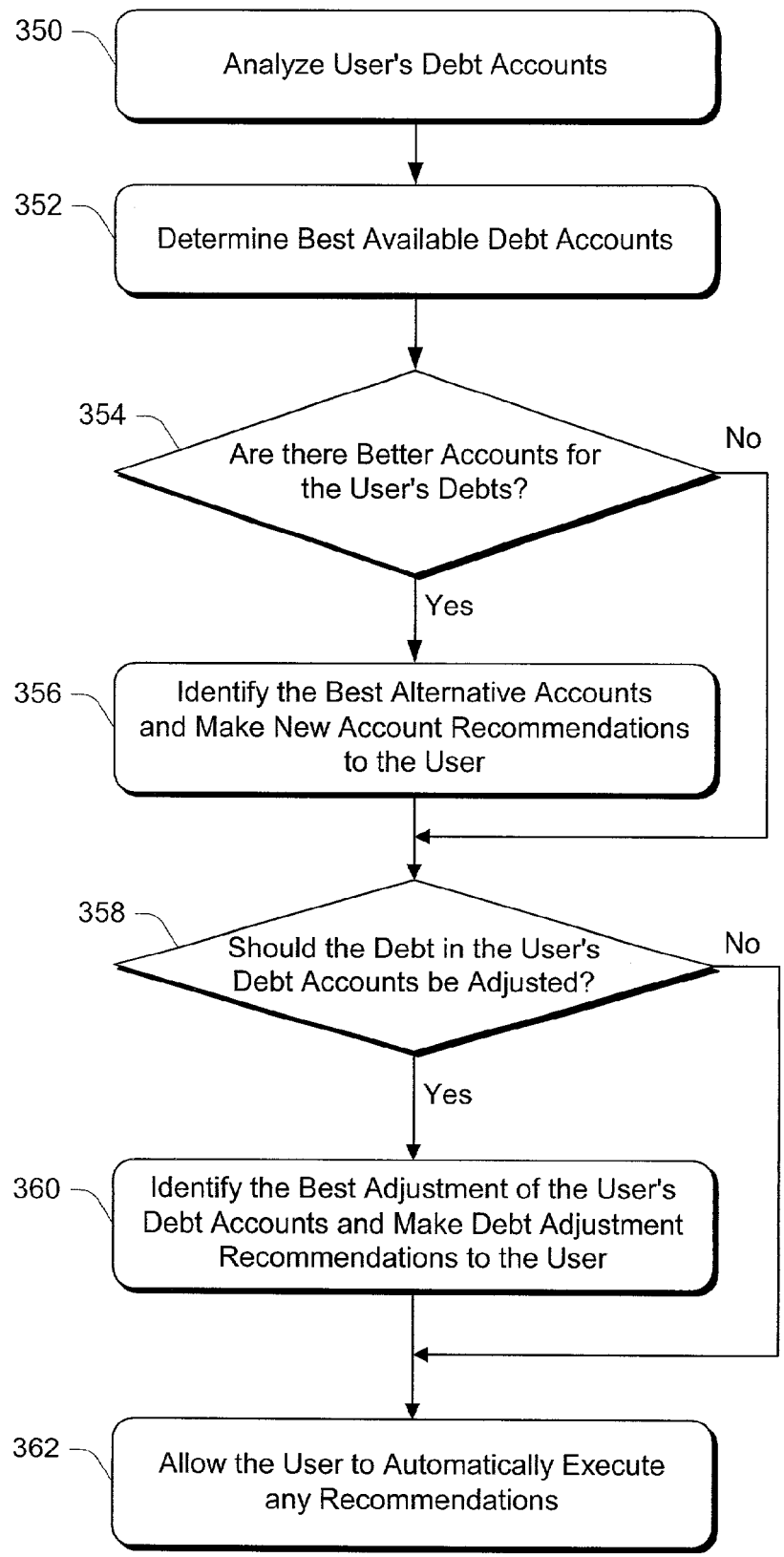
FIG. 9 is a flow diagram illustrating a procedure for identifying financial transactions to optimize a user's debt account balances.

FIG. 9 is a flow diagram illustrating a procedure for identifying financial transactions to optimize a user's debt account balances. The procedure analyzes the user's debt accounts (block 350) and determines the best available debt accounts (block 352). The best available debt accounts are determined, for example, by using market interest rate information from one or more market information services. Next, the procedure determines whether there are better accounts for the user's debts (block 354). These "better" accounts may include debt accounts that charge lower interest rates than the user's current debt accounts.

If better accounts are identified for the user's debts, then the procedure selects the best alternative account (or accounts) and makes a recommendation that the user open the alternative account (block 356). If the procedure does not identify any better accounts for the user's debts, then the procedure continues to block 358, to determine whether the debts in the user's accounts should be adjusted. If the user's debt accounts should be adjusted, then the procedure identifies the best adjustment of the user's debt accounts and makes asset adjustment recommendations to the user (block 360). Finally, the user is provided the opportunity to automatically execute any of the recommendations, such as opening one or more new debt accounts and/or moving funds between debt accounts (block 362). If the user chooses to have the recommendations executed automatically, the financial management system executes the necessary financial transactions to implement the system's recommendations. The procedure described above with respect to FIG. 9 can be implemented, for example, by debt analysis and recommendation module 232.

Figure 10:
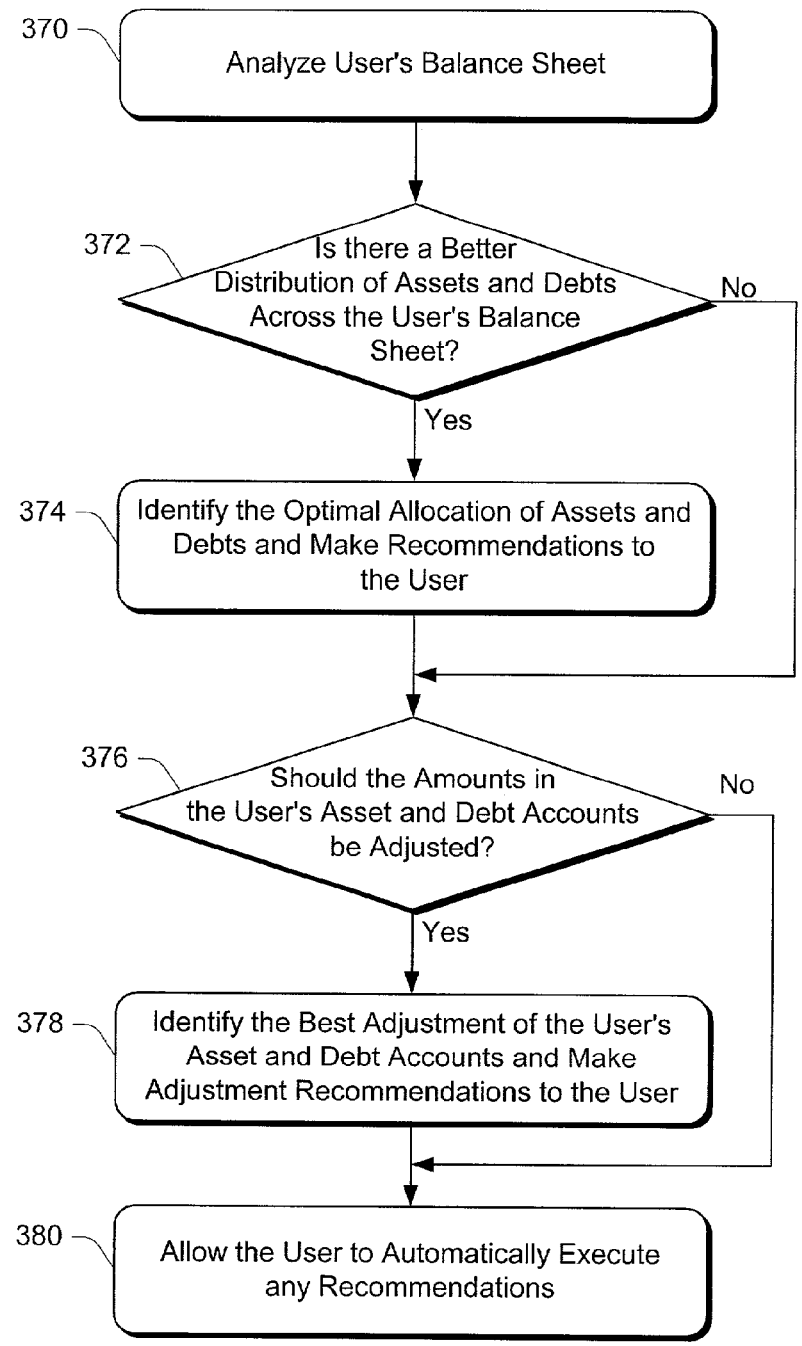
FIG. 10 is a flow diagram illustrating a procedure for identifying financial transactions to optimize a user's balance sheet.

FIG. 10 is a flow diagram illustrating a procedure for identifying financial transactions to optimize a user's balance sheet. The procedure analyzes the user's balance sheet (block 370) and determines whether there is a better distribution of assets and debts across the user's balance sheet (block 372). For example, a "better distribution" of assets and debts may result in greater interest earned by the user or less interest paid by the user. If there is a better distribution of assets and debts across the user's balance sheet, then the procedure identifies the optimal allocation of assets and debts and makes recommendations to the user (block 374).

If the procedure does not identify any better distribution of assets and debts, then the procedure continues to block 376, to determine whether the amounts in the user's asset and debt accounts should be adjusted. If the user's accounts should be adjusted, then the procedure identifies the best adjustment of the user's asset and debt accounts and makes adjustment recommendations to the user (block 378). Finally, the user is provided the opportunity to automatically execute any of the recommendations (block 380), such as moving funds between accounts to maximize interest earned or minimize interest paid. If the user chooses to have the recommendations executed automatically, the financial management system executes the necessary financial transactions to implement the system's recommendations. The procedure described above with respect to FIG. 10 can be implemented, for example, by balance sheet analysis and recommendation module 234.

A user may choose to have the financial management system 220 (FIG. 4) analyze and make recommendations regarding the user's asset accounts, while ignoring the user's debt accounts. FIG. 8 illustrates an example procedure for this type of analysis and recommendation. Additionally, the user may select specific asset accounts to ignore during the analysis procedure. For example, the user may have a savings account for a special purpose. Even though the savings account may earn a below-average interest rate, the user does not want funds transferred into or out of that savings account. In this example, the user would instruct the financial management system to ignore that particular savings account.

The user may also choose to have the financial management system analyze and make recommendations regarding the user's debt accounts, while ignoring the user's asset accounts. FIG. 9 illustrates an example procedure for this type of analysis and recommendation. Additionally, the user may select specific debt accounts to ignore during the analysis procedure. For example, the user may want to pay-off and close a particular debt account even though the account has a favorable interest rate. In this example, the user would instruct the financial management system to ignore that particular debt account when performing its analysis.

The user can also choose to have the financial management system analyze and make recommendations regarding both the user's asset accounts and debt accounts (i.e., analyze the user's balance sheet). FIG. 10 illustrates an example procedure for this type of analysis and recommendation. Additionally, the user may select specific asset accounts or debt accounts to ignore during the analysis procedure. Thus, the user has the option of selecting the types of accounts to consider, as well as specific accounts to consider or ignore, when the financial management system performs its analysis and makes recommendations.

Figure 11:
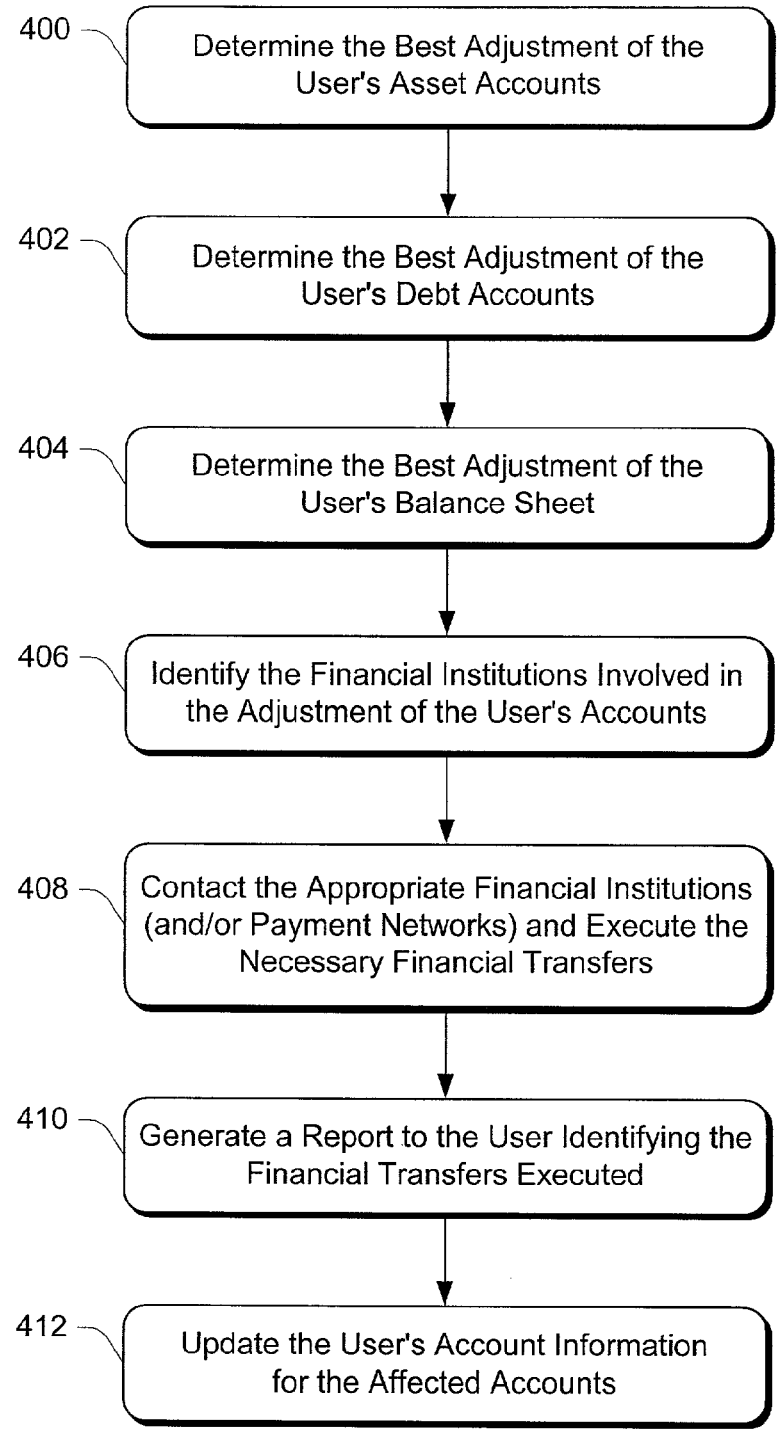
FIG. 11 is a flow diagram illustrating a procedure for automatically optimizing a user's asset accounts, debt accounts, and balance sheet.

FIG. 11 is a flow diagram illustrating a procedure for automatically optimizing a user's asset accounts, debt accounts, and balance sheet. Initially, the procedure determines the best adjustment of the user's asset accounts (block 400). The best adjustment of the user's asset accounts may include opening a new account, closing an existing account, and/or transferring funds between accounts (new accounts or existing accounts). If the user's asset accounts are already optimized, or almost optimized, the procedure determines that no adjustment of asset accounts is necessary.

Next, the procedure determines the best adjustment of the user's debt accounts (block 402) and the best adjustment of the user's balance sheet (block 404). The best adjustment of the user's debt accounts and the user's balance sheet may include opening one or more new accounts, closing one or more existing accounts, and/or transferring funds between accounts (new accounts or existing accounts). If the user's debt accounts are already optimized, or almost optimized, the procedure determines that no adjustment of debt accounts is necessary. Similarly, if the user's balance sheet is already optimized, or almost optimized, then the procedure determines that no adjustment of asset accounts or debt accounts is necessary.

The various logic rules discussed above, which are used by the financial management system to determine whether funds should be adjusted between accounts, may define how to determine whether accounts are "almost optimized." Typical factors that may be considered in determining whether accounts are "almost optimized" include: the savings (extra interest earned or less interest paid) that would result from an adjustment of funds, the difference in interest rates, the time required to implement the adjustment of funds, fees associated with the adjustment of funds, and the "risk" associated with the adjustment. The "risk" may be overdrawing an account by leaving too little funds to cover unexpected expenses (or expenses that are greater than expected).

For example, if a particular adjustment of funds would result in an increase in interest earnings of three cents per week, most logic rules will consider this situation "almost optimized." In this situation, the financial management system will not recommend the adjustment of funds because the additional interest is insignificant.

After the procedure has determined the best adjustment of the user's accounts (blocks 400, 402, and 404), the procedure identifies the financial institutions involved in the adjustment of the user's accounts (block 406). The financial institutions are determined from the information entered by the user when identifying the user's accounts to the financial management system. Next, the procedure contacts the appropriate financial institutions and/or payment networks and executes the financial transfers necessary to implement the recommended adjustments to the user's accounts (block 408). A payment network may be, for example, the Federal Automated Clearing House (ACH), a debit network, a credit network, the federal wire system, or an ATM network. The financial management system is able to automatically access the user's accounts by using the login name and password for the account, which is provided by the user when identifying the user's accounts to the financial management system.

After executing the financial transactions necessary to implement the recommended adjustments to the user's accounts, the a report is generated for the user that identifies the financial transfers executed (block 410). Finally, the user's account information is updated in the financial management system such that the system has accurate account balance information for all of the user's accounts (block 412).

The procedure described above with respect to FIG. 11 can be modified based on the user's preferences with respect to the types of accounts to be analyzed. For example, if the user selects only asset accounts for analysis, then the functions associated with blocks 402 and 404 of the procedure are not performed.

FIG. 12 shows a table 430 illustrating various information associated with different financial institutions. The information contained in table 430 may be obtained from the financial institution itself or from one or more market information services. The information contained in table 430 is periodically updated by comparing the information stored in the table against the current financial institution information.

The first column of table 430 identifies the name of the financial institution and the second column identifies the American Banking Association (ABA) number and routing number. The third column indicates an Internet uniform resource locator (URL) associated with the financial institution. The fourth column of table 430 identifies the various account offerings from a particular financial institution. In this example, Bank of America offers a savings account, two types of checking accounts (interest bearing and non-interest bearing), a three month certificate of deposit (CD), a home equity loan, a credit card account, and overdraft protection for a checking account. The next column indicates the type of account (e.g., an asset account or a debt account).

The sixth column of table 430 indicates the current interest rate associated with each account. In the case of an asset account, the interest rate is the interest paid to a customer based on the balance in the account. In the case of a debt account, the interest rate is the interest charged to a customer based on the outstanding balance of the debt. The last column in table 430 indicates the minimum balance associated with each account. In this example, the debt accounts do not have a minimum balance. However, a debt account may have a maximum balance (e.g., the maximum value that can be loaned). Although not shown in FIG. 12, additional account information may be stored in table 430, such as monthly service charges, per-check charges, service charges for ATM transactions, or service charges if the minimum balance is not maintained.

FIG. 13 shows a table 440 illustrating various customer information related to financial accounts and user preferences. Most information contained in table 440 is obtained from the user during an account setup procedure. The current account balance information is typically retrieved from the financial institution by the financial management system. The account balance information is periodically updated by retrieving current information from the financial institution.

The first column of table 440 identifies the customer name (the table contains customer information for multiple customers accessing the same financial management system). The second column identifies a financial institution and the third column identifies an account number as well as an online username and password associated with the account number. The username and password are used to access the account to perform online banking functions such as executing fund transfers or retrieving current account balances. The fourth column of table 440 identifies the accounts that the customer has with the financial institution (i.e., active accounts). For example, John Smith has five active accounts with Bank of America (savings, interest checking, home equity, credit card, and overdraft protection), one active account with Charles Schwab (money market account), and one active account with Rainbow Credit Union (savings account). The next column in table 440 indicates the current account balance for each active account. The last column indicates user preferences. The user preferences are determined by the user based on the manner in which the user wants information displayed, the manner in which accounts should be analyzed, and the types of recommendations the user desires. Additionally, the user preferences may specify certain minimum balances or other requirements for all accounts or for specific accounts. For example, the user preferences for John Smith specify that a minimum balance of $1500 should be maintained in the interest checking account. These user preferences are typically incorporated into the logic rules, discussed above, which are used to determine when and how to adjust funds between accounts.

Other types of user preferences include a maximum number of transactions per month in a particular account (e.g., some money market accounts set limits on the number of transactions in a particular month). By setting a user preference (or a logic rule) to limit the number of monthly transactions, the financial management system will not recommend (or attempt to execute) too many transactions in a particular month. A user may also set a preference that requires the financial management system to predict expenses for the next seven days (e.g., based on historical expenses during similar periods) and maintain a "buffer" in the account equal to the predicted expenses for the next seven days. Further, a user may set a preference indicating that funds should not be adjusted unless the adjustment results in a savings of at least five dollars per day.

Figure 14:
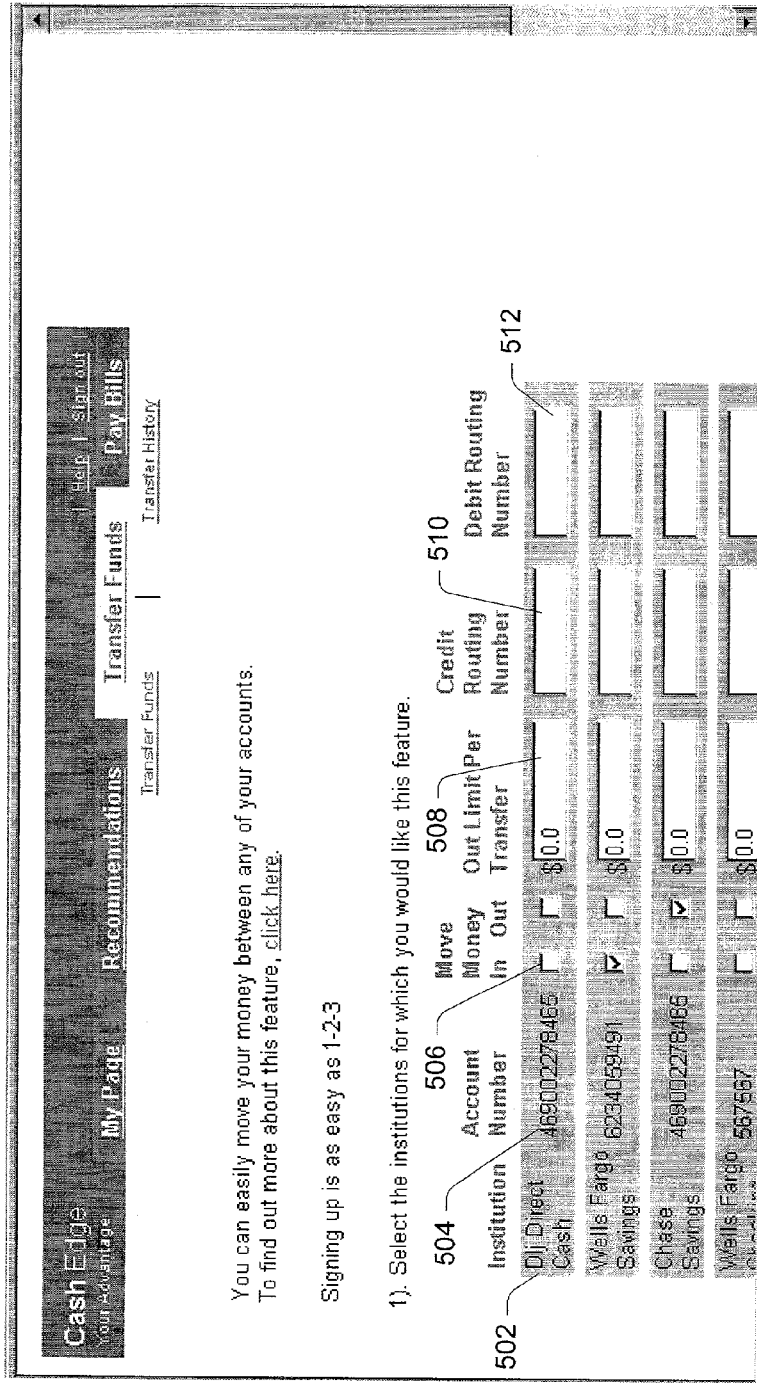
FIGS. 14-15 illustrate exemplary user interface screens illustrating various account entry fields and account recommendations.
Figure 15:
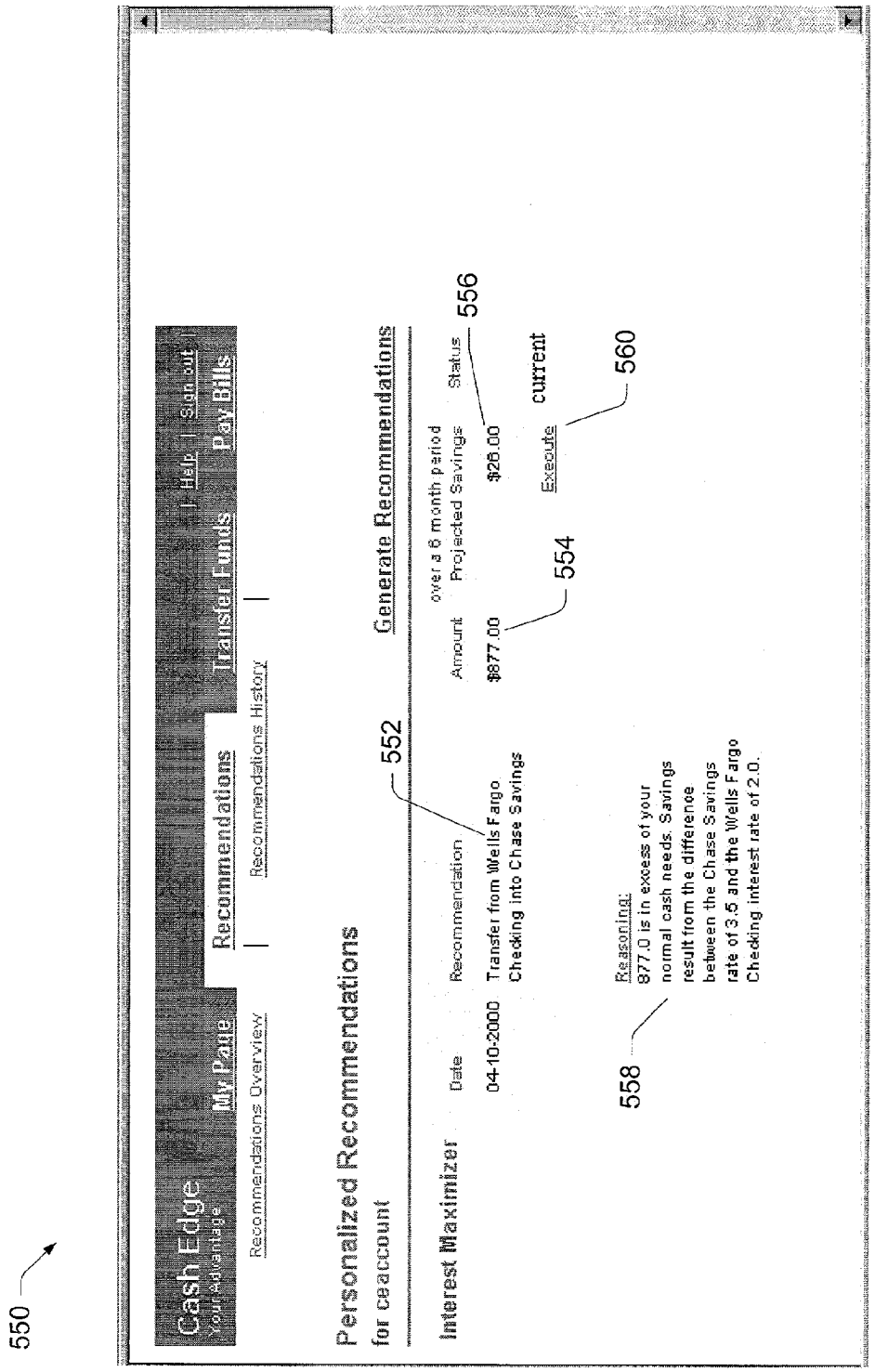

FIGS. 14-15 illustrate exemplary user interface screens illustrating various account entry fields and account recommendations. FIG. 14 illustrates an example screen 500 generated by a web browser or other application that allows a user to enter account information and preferences. Each entry identifies an institution 502 associated with the account and an account number 504. The user may select whether the financial management system has access to move funds into the account, out of the account, or both, by selecting the appropriate check boxes 506. The user may also set a maximum amount that can be withdrawn from the account at a particular time or during a particular time period by entering the amount in field 508. The credit routing number for the account is entered in field 510 and the debit routing number for the account is entered in field 512.

Although not shown in FIG. 14, other fields may be provided in the user interface to allow the user to enter additional preferences or information, such as interest rate, minimum balance the user wants maintained, etc. Certain account information (such as interest rate and routing numbers) may be obtained from the bank directly, thereby minimizing the information required to be entered by the user.

FIG. 15 illustrates another example screen 550 generated by a web browser or other application that allows a user to review recommendations generated by the financial management system. In the example of FIG. 15, one recommendation 552 is shown—to transfer funds from the Wells Fargo Checking account into the Chase Savings account. A recommended amount to transfer 554 has also been identified. If the recommendation is executed, the projected savings 556 over the next six months is $26. The reasoning or analysis supporting the recommendation and the projected savings is provided at 558. The user can execute the recommendation by activating the "Execute" button 560 on the screen. After activating the "Execute" button, the financial management system automatically performs the necessary steps to transfer the recommended funds between the two accounts.

In an alternate embodiment, the user is given the option to modify the amount to be transferred between the two accounts. For example, the user may only want to transfer $500 instead of the recommended $877. In this situation, the financial management system is still able to automatically perform the steps necessary to transfer $500 between the two accounts.

Figure 16:
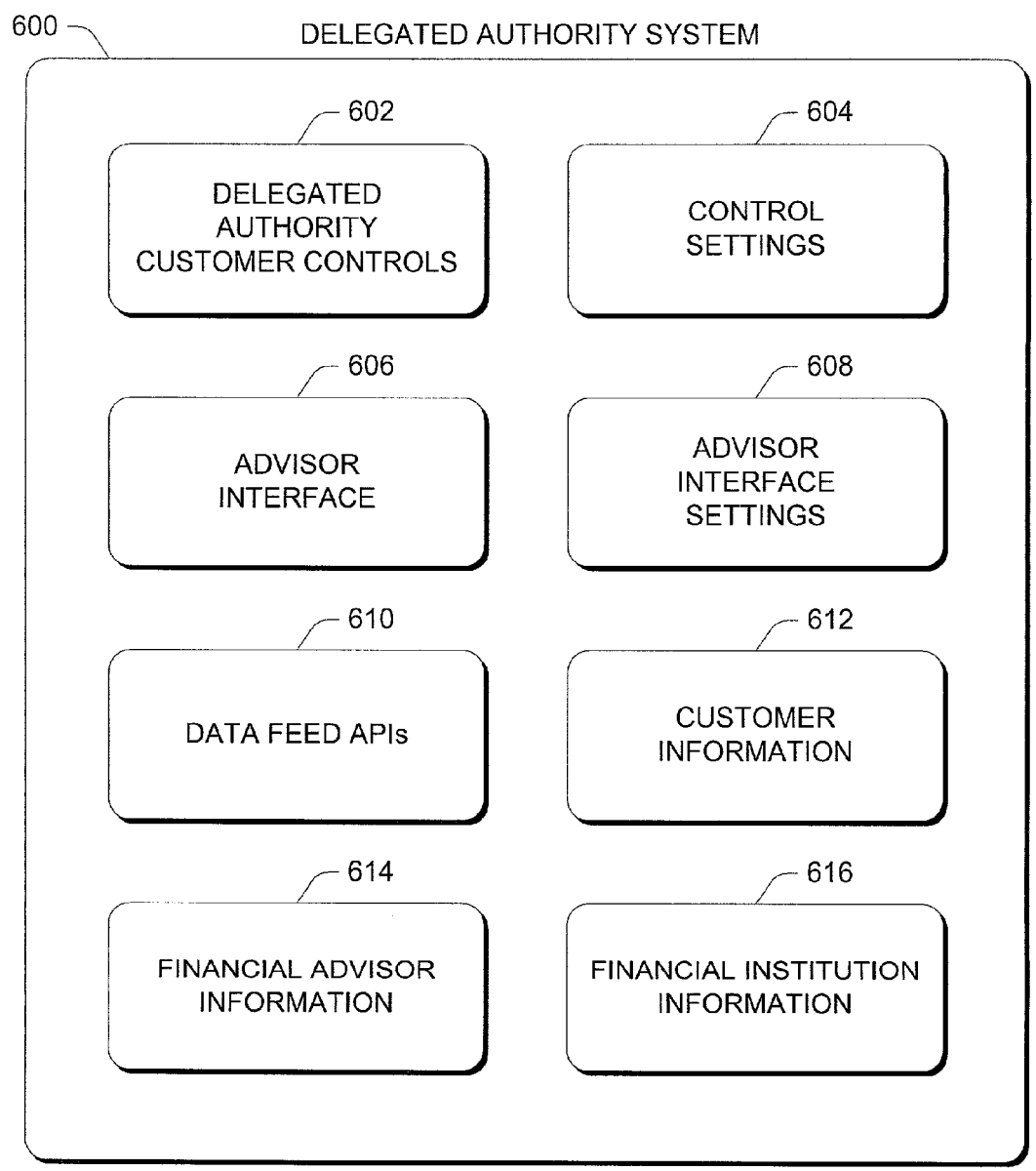
FIG. 16 is a block diagram showing exemplary components, modules, and data of a delegated authority system.

FIG. 16 is a block diagram showing exemplary components, modules, and data of a delegated authority system 600. A customer may delegate financial authority to one or more individuals, such as financial advisors, to access various accounts at one or more financial institutions. Alternatively, a customer may delegate financial authority to one or more individuals to access account data aggregated from the customer's various financial accounts. As discussed below, different advisors may receive different authority depending on the needs of the advisors and the customer's willingness to delegate financial authority to a particular advisor. For example, one advisor may be permitted to access all financial data while another advisor may be restricted to viewing summary account information. Delegated authority system 600 may be contained in a financial management system (e.g., financial management system 118 in FIG. 1), or any other system that is capable of being accessed by customers and financial advisors. In a particular embodiment, the delegation services discussed herein are offered by a third party that is accessible via the Internet or other data communication network.

The delegated authority system 600 includes delegated authority customer controls 602, which allows a customer to identify financial advisors and delegate specific financial authority to those advisors. The financial authority delegated to each financial advisor is stored in a control settings file 604. These control settings 604 are accessed prior to allowing a financial advisor to access a customer account. An advisor interface 606 allows financial advisors to manage and view financial data from one or more clients, generate reports, generate alerts based on client data, and communicate with clients via a message board and/or via email. Advisor interface settings 608 define various information established by an advisor, such as client list, one or more predefined view formats for viewing client data and one or more predefined report formats for generating reports based on client data. Additional details regarding the advisor interface 606 are provided below.

Data feed APIs 610 enable advisors to import or export a customer's financial data for use with other applications, such as the advisor interface 606. Customer information 612 identifies information related to customers that have accessed the delegated authority system 600. This information includes, for example, customer name and address, customer account information, and the like. Customer information 612 may also include information regarding a user's various accounts at one or more financial institutions. Additionally, customer information 612 may include information regarding the customer's non-liquid assets such as boats, cars, or houses. This information is provided to an authorized advisor to use in determining a client's net worth or when performing other financial calculations or evaluations.

Financial advisor information 614 identifies information related to advisors that have been identified by a customer and/or have registered with the delegated authority system 600. This information may include the advisor's name and address, customers with which the advisor has received delegated financial authority, etc. Financial institution information 616 identifies information related to one or more financial institutions. The financial institution information 616 may include ABA number and routing number, online access information, communication protocols, etc.

Figure 17:
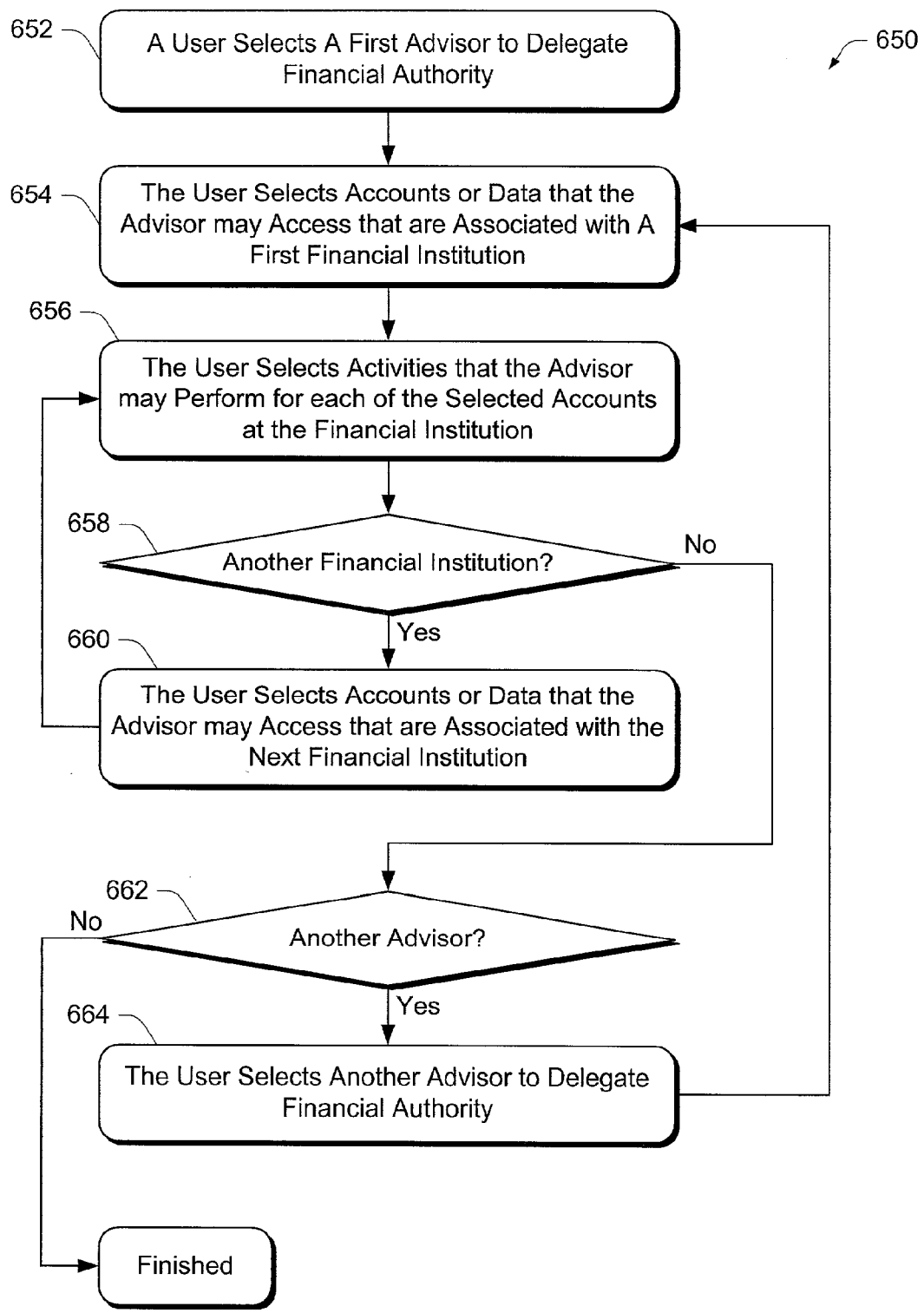
FIG. 17 is a flow diagram illustrating a procedure for delegating financial authority to one or more advisors.

FIG. 17 is a flow diagram illustrating a procedure 650 for delegating financial authority to one or more advisors. Initially, a user (e.g., a customer) selects a first advisor to delegate financial authority (block 652). The user selects accounts or data that the advisor may access that are associated with a first financial institution (block 654). For example, the advisor may be permitted to access savings account information and checking account information, but not credit card account information. As mentioned above, the advisor may be permitted to retrieve information from the user's individual accounts or the advisor may be granted access to retrieve aggregated data collected from some or all of the user's accounts.

The user then selects activities or functions that the advisor may perform for each of the selected accounts at the financial institution (block 656). For example, the advisor may be permitted to access account data (at different levels of detail), but is not permitted to withdraw, deposit, or transfer funds. Additionally, the user determines whether the advisor is restricted to viewing summary information or whether the advisor is also able to view data associated with individual transactions, such as individual stock purchases or sales, or individual deposits and withdrawals.

A user can change the settings associated with a particular advisor or group of advisors at any time. Thus, a user can delegate authority to a new advisor, withdraw rights from a particular advisor or grant additional rights to a particular advisor at any time. In a particular embodiment, these changes are enacted through a third party service that is accessible via the Internet or other data communication network.

After selecting accounts and activities associated with the first financial institution, the procedure 650 determines whether there are additional financial institutions with which the user has an account (block 658). If there are additional financial institutions, the user selects accounts or data that the advisor may access that are associated with the next financial institution (block 660). The procedure then returns to block 656, where the user selects activities that the advisor may perform for each of the selected accounts at the next financial institution.

After all financial institutions have been configured by the user, the procedure branches to block 662 to determine whether the user wants to delegate financial authority to another advisor. If so, the user selects or identifies another advisor to delegate financial authority (block 664) and the procedure returns to block 654, where the user selects accounts or data that the advisor may access that are associated with a first financial institution. The procedure continues until the user has delegated financial authority to all desired advisors.

In the procedure 650 illustrated in FIG. 17, the user selects accounts/data and activities to be associated with each advisor to which financial authority is delegated. In alternate embodiments, a particular account (or collection of data) or a particular activity may have the same settings for all advisors. In this embodiment, the user can set the parameters once and have those same parameters applied to all advisors. The user is still able to change the settings in the future and use individual settings for different accounts or activities.

When a customer selects a particular advisor, the customer specifies the advisor name, email address, and a secret code. The customer communicates this secret code to the advisor, thereby allowing the advisor to access the customer's accounts through the delegated authority system. Before an advisor can utilize the delegated authority system, the advisor must register with the delegated authority system. Advisors that have been identified by a customer receive an email message that includes a link (e.g., a uniform resource locator (URL)) to a login page. New advisors may be required to complete a registration form that contains information regarding the advisor, such as name, mailing address, email address, login information, financial certifications, etc.

Alternatively, a particular financial institution may have a dedicated group of financial advisors from which the customer selects an advisor. For example, the user may be presented with a list of advisors and asked to select one of the advisors to work with the customer. The list may include information about each advisor, such as their experience level, areas of specialization, etc. In certain situations, an advisor may be selected for the customer by the financial institution based on the anticipated needs of the customers and the proficiencies and/or availability of the advisors.

Figure 18:
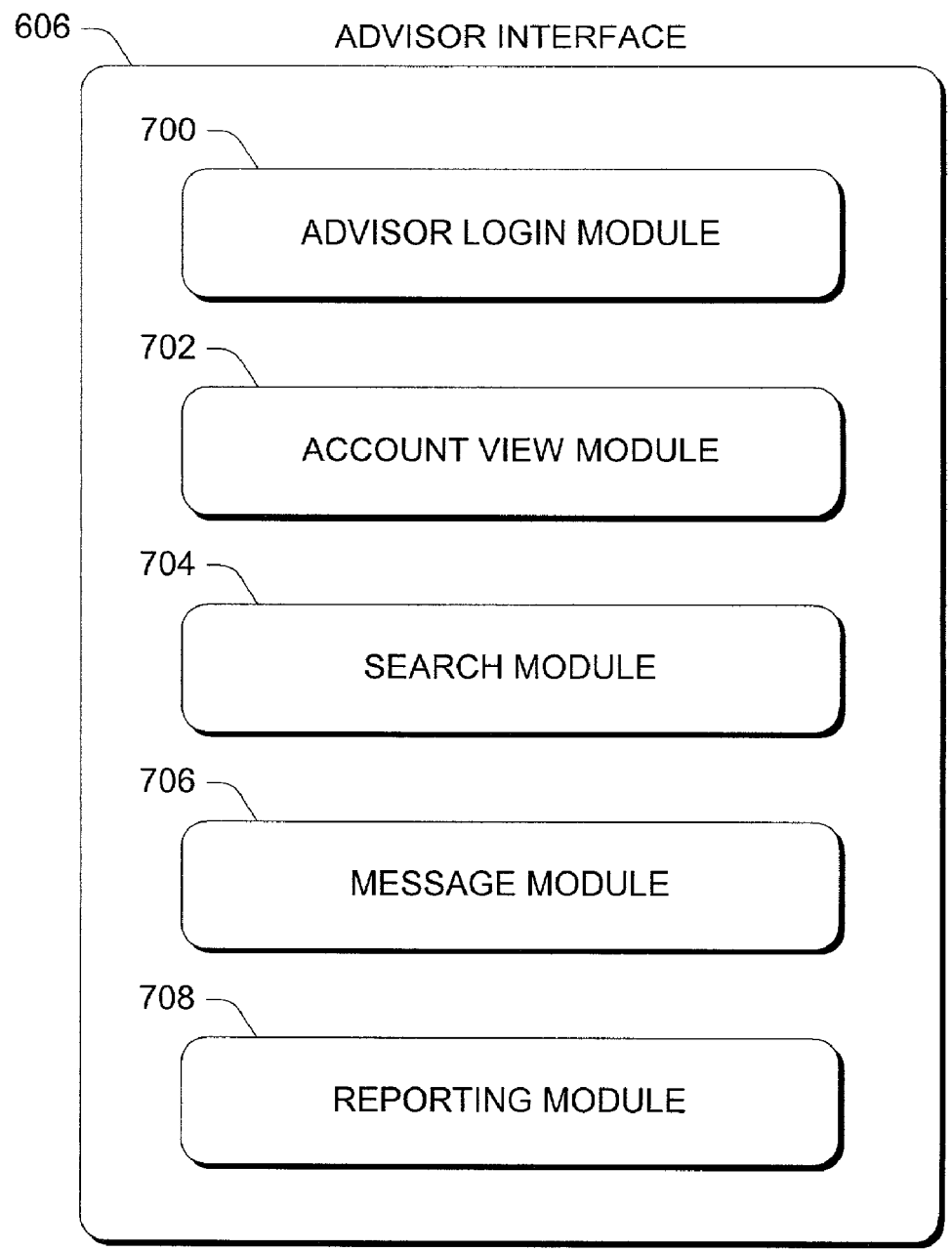
FIG. 18 is a block diagram showing exemplary components and modules of an advisor interface.

FIG. 18 is a block diagram showing exemplary components and modules of advisor interface 606. An advisor login module 700 collects login information from an advisor and verifies their permission to access the delegated authority system. An account view module 702 provides a consolidated view of all accounts for a particular client or for all clients of a particular advisor. The view module 702 can display aggregated financial data collected from multiple accounts at multiple financial institutions. A search module 704 may search through client accounts to identify common information (e.g., common equities owned by multiple clients) and more effectively manage clients.

In a particular example, an advisor uses the above modules 700-704 (as well as the modules discussed below) as the advisor's client management system. These modules allow the advisor to, for example, analyze client portfolios and keep track of assets under management, fees collected by the advisor based on the assets under management, and determine what type of new client development might be beneficial to the advisor. The modules also allow the advisor to automate client communication based on events across the portfolio. For example, the advisor may establish an email alert procedure that sends an email message to all clients in the advisor's portfolio that own a particular security if that security changes by more than ten percent. Thus, rather than creating a separate procedure for each client that owns the same security, a single procedure can generate the email message for all of the advisor's clients owning that security.

A message module 706 provides a messaging tool that enables advisors to communicate with clients via message boards and/or email. The message module 706 operates in conjunction with the search module 704 to communicate messages to all clients that share a common financial situation (e.g., all clients that own a particular equity, or all clients that have accounts at a particular financial institution). A reporting module 708 generates various reports based on the accounts of one or more clients. For example, reporting module 708 can generate a report identifying the consolidated equity holdings of all clients.

The delegated authority system described herein provides an improved mechanism for a financial advisor or other individual to collect information regarding a client's financial situation. The client's account information can be collected directly from the financial institutions, thereby providing account information that is current, rather than several days or several weeks old. Additionally, the financial advisor can view all account information from multiple financial institutions simultaneously to get a better understanding of the client's financial situation.

The delegated authority system described herein can be used in combination with a system that aggregates data from multiple accounts at multiple financial institutions. However, alternate embodiments of the delegated authority system can be implemented without such a data aggregation system.

An example data aggregation system collects financial data from various financial institutions using direct data feeds, XML exchange, data harvesting scripts, and/or other data extraction/data acquisition routines. The collected data is normalized and stored in a database using a standard format. Certain data may be collected by analyzing and/or capturing various web pages. Data is extracted from the web pages, normalized, and stored in the database. Personal or confidential information may be deleted from captured web pages before storing the web page data.

Figure 19:
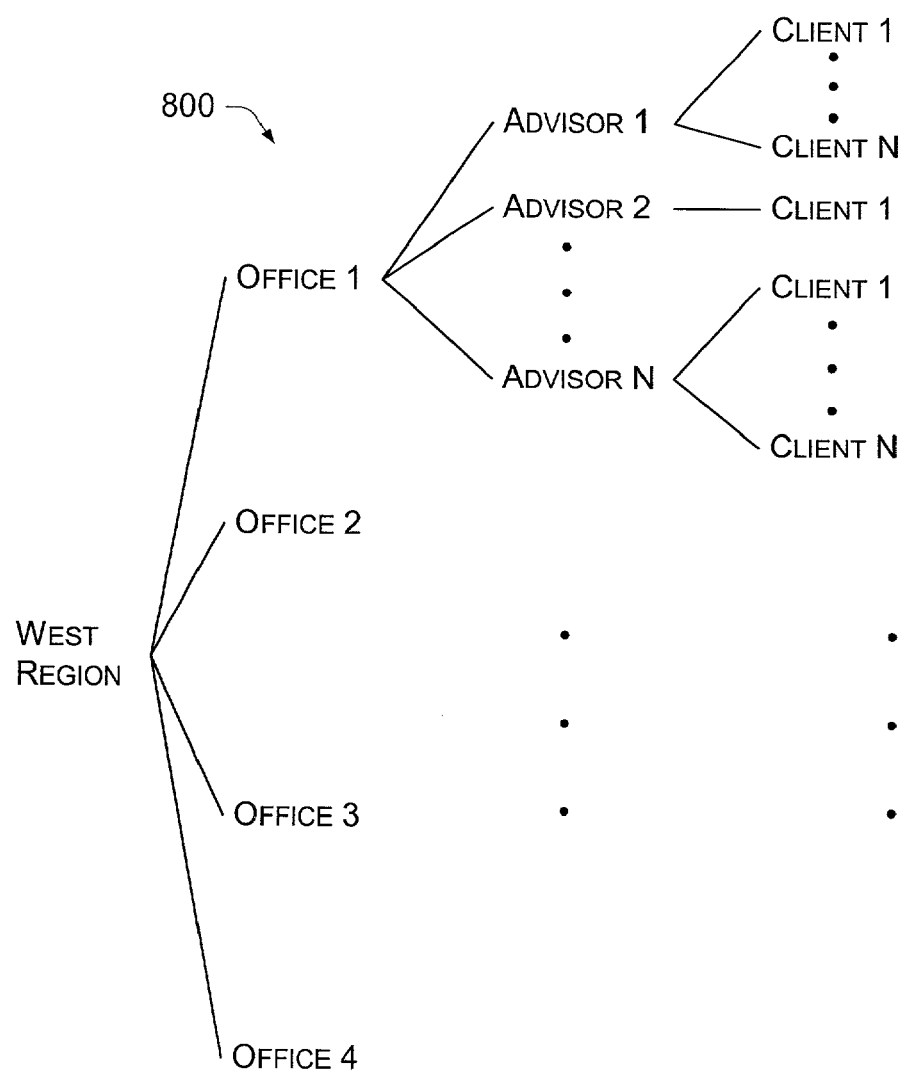
FIG. 19 illustrates a hierarchy of multiple clients, multiple advisors, and multiple advisor affiliations.

FIG. 19 illustrates a hierarchy 800 of multiple clients, multiple advisors, and multiple advisor affiliations. The hierarchy 800 represents all offices in the West Region of an organization (such as a financial services provider), advisors associated with those offices, and account holders associated with those advisors. In this example, the West Region has four offices, each of which has multiple advisors. Although advisors and associated account holders are only shown for Office 1 in FIG. 19, all offices may contain similar advisor-account holder relationships. Each advisor typically works with multiple clients, although a new advisor may start with one or two clients.

The hierarchy 800 allows individual advisors to collect data associated with all of the advisor's clients. This collected data may include the aggregated financial data associated with each of the advisor's clients. Similarly, a particular office can collect data from all advisors, thereby resulting in a collection of data from all clients associated with any of the office's advisors. Further, a particular region of the organization can collect data from all offices in the region, resulting in a collection of data from all clients associated with any of the advisors in any of the offices in the particular region. The organization can then collect data from all regions, thereby resulting in a collection of data from all clients associated with any part of the organization.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   automatically receiving account data in a financial management system via a network, wherein automatically receiving comprises retrieving data that is resident on a storage medium, wherein the account data comprises,
   an identification of a plurality of financial institutions;
   an identification of a plurality of accounts;
   an identification of an account holder; and
   identifications of one or more entities to whom the account holder delegates access to the plurality of accounts;
   the financial management system receiving, and storing for later use, the account holder's authentication credentials for accessing each of the plurality of financial institutions without participation of the account holder;
   the financial management system using the authentication credentials to automatically collect account data from each of the plurality of financial institutions, wherein collecting comprises using direct data feeds, XML exchange, and data harvesting scripts, wherein automatically collecting account data comprises the financial management system connecting to the plurality of financial institutions without human intervention;
   storing the account data in the financial management system;
   automatically receiving account data from the financial institution via the network;
   updating the stored account data; and
   providing access to the stored account data to the one or more entities.

2. A method as recited in claim 1 wherein the identifications are stored in a server accessible via the Internet.

3. A method as recited in claim 2 further comprising:
   automatically receiving updated account data for the plurality of accounts from a plurality of institutions via a network; and
   automatically receiving summary data associated with the plurality of accounts.

4. A method as recited in claim 1 wherein the method is performed through a service accessible via the Internet.

5. A method as recited in claim 1 wherein the entity comprises an individual financial advisor.

6. A method as recited in claim 1 wherein the entity comprises an individual attorney.

7. A method as recited in claim 1 wherein the entity comprises an individual accountant.

8. A method as recited in claim 1 wherein the entity comprises a spouse of the account holder.

9. A method comprising:
   automatically receiving account data in a financial management system via a network, wherein automatically receiving comprises retrieving data that is resident on a storage medium, wherein the account data comprises, an identification of at least one financial institution;
an identification of at least one account;
an identification of an account holder; and
identifications of one or more entities to whom the account holder delegates access to the account;
the financial management system receiving the account holder's authentication credentials for accessing the at least one financial institution;
the financial management system storing the account data and the authentication credentials for later use without participation of the account holder, comprising using the authentication credentials to automatically collect account data from the at least one financial institution, wherein collecting comprises using direct data feeds, XML exchange, and data harvesting scripts without participation of a human user;
storing the account data in the financial management system;
receiving a request from the entity to access at least one of the at least one account; and
granting access in response to the request, comprising granting access for reviewing current account information, comprising account information that is automatically updated by a communication with an institution administering the account being accessed.

10. A method as recited in claim 9 wherein the entity comprises an individual financial advisor.

11. A method as recited in claim 9 wherein the entity comprises a spouse of the account holder.

12. A method as recited in claim 9 wherein the entity comprises an individual attorney of the account holder.

13. A method as recited in claim 9 wherein granting access comprises automatically retrieving account information through a third-party financial management system.

14. A method as recited in claim 9 wherein the method is performed through a third-party service accessible via the Internet.

15. A method comprising:
receiving, and storing for later us without the participation of a the second account holder, authorization from a first account holder, wherein authorization comprises data including authentication credentials allowing an entity identified by the first account holder to access data of a first account owned by the a first account holder;
receiving, and storing for later use without the participation of the second account holder, authorization from a second account holder, wherein authorization comprises data including authentication credentials allowing an entity identified by the second account holder to access data of a second account owned by the second account holder, wherein the entity identified by the first account holder and entity identified by the second account holder are the same entity;
in response to an access request from the entity, automatically retrieving current account information from the first account, wherein retrieving comprises using the authentication credentials to access current account information that is automatically collected from an institution associated with the first account, comprising using direct data feeds, XML exchange, and data harvesting scripts;
in response to an access request from the entity, retrieving account information from the second account, wherein retrieving comprises using the authentication credentials to access current account information that is automatically collected from an institution associated with the second account, comprising using direct data feeds, XML exchange, and data harvesting scripts without human input.

16. A method as recited in claim 15 wherein the institution associated with the first account and the institution associated with the second account are the same financial institution.

17. A method as recited in claim 15 wherein the institution associated with the first account is a first financial institution and the institution associated with the second account is a second financial institution.

18. A method as recited in claim 15 further comprising:
receiving authorization from the first account holder, wherein authorization comprises data allowing an entity identified by the first account holder to access a third account associated with the first account holder;
automatically retrieving account information from the third account; and aggregating data from the first account with data from the third account.

19. A method as recited in claim 15 wherein receiving authorization to access the first account includes receiving permission to perform specific activities with respect to the first account.

20. A method as recited in claim 15 wherein receiving authorization to access the first account includes receiving permission to obtain account information via an online source.

21. A method as recited in claim 15 wherein receiving authority to access the first account includes receiving permission to transfer funds into and out of the first account.

22. A method as recited in claim 15 further comprising:
generating a report based on account information retrieved from the first account and the second account, wherein the account information is retrieved automatically via at least one financial institution via at least one network.

23. A method as recited in claim 15 further comprising:
searching for account information that is common to both the first account and the second account.

24. A method as recited in claim 15 further comprising:
automatically generating messages based on account information that is common to both the first account and the second account, wherein the messages comprise electronic messages that are automatically transmitted to at least on recipient.

25. A financial management system, comprising:
at least one computer processor;
computer memory coupled to said at least one computer processor and programmed with at least a financial institution data module, a customer data module, and a communications interface;
wherein the financial institution data module stores financial institution data related to a plurality of financial institutions;
wherein the customer data module stores customer data related to a plurality of customers, wherein the customer data for a customer comprises:
identification information for a plurality of financial accounts owned by the customer at least one of the plurality of financial institutions;
identification information for at least one authorized entity that is authorized by the customer to access data of at least one of the plurality of financial accounts owned by the customer;
authentication credentials that allow access to collected data of a financial institution transparently to the institution via a publicly accessible portal of the institution; and permission information for the at least one authorized entity, wherein the permission information indicates types of access to at least one of the plurality of financial accounts owned by the customer, comprising one or more of reviewing current account balances, and reviewing account transactions, and reviewing position information, wherein position information comprises amounts of shares and values of shares, wherein the customer data is stored for later use in accessing financial accounts without participation of the customer; and wherein the communications interface is coupled to at least one network and automatically collects and provides updated data from the plurality of financial accounts to the at least one authorized entity, wherein collecting comprises using direct data feeds, XML exchange, and data harvesting scripts without human input.

26. The financial management system of claim 25, further comprising:

a transaction execution module coupled to the plurality of financial institutions via the at least one network and further coupled to at least one payment network via the at least one network, wherein the transaction module is configurable to execute the transactions involving the at least one of the plurality of financial accounts.

27. A non-transitory computer-readable medium, having stored thereon instructions that when executed in a processor, cause a financial management method to be performed, the method comprising:

automatically receiving, and storing for later us without the participation of an account holder, account data in a financial management system via a network, wherein the account data comprises:
an identification of a plurality of financial institutions;
an identification of a plurality of accounts;
an identification of an account holder; and
identifications of one or more entities to whom the account holder delegates access to the plurality of accounts;

the financial management system receiving the account holder's authentication credentials for accessing each of the plurality of financial institutions;

the financial management system using the authentication credentials to automatically collect account data from each of the plurality of financial institutions, wherein collecting comprises using direct data feeds, XML exchange, and data harvesting scripts, wherein automatically collecting account data comprises the financial management system connecting to the plurality of financial institutions without human intervention;

updating the stored account data based on the received updated account data; and providing access to the stored account data to the one or more entities.

28. A method as recited in claim 9 wherein the entity comprises an individual accountant.

29. A method as recited in claim 9 wherein permitting the entity to access the first account and the second account includes retrieving position details associated with the first account and the second account, wherein position details comprise amounts of shares and values of shares.

* * * * *